(12) United States Patent
Sethumadhavan et al.

(10) Patent No.: US 10,599,847 B2
(45) Date of Patent: *Mar. 24, 2020

(54) IMPLEMENTATIONS TO FACILITATE HARDWARE TRUST AND SECURITY

(71) Applicant: The Trustees of Columbia University in the City of New York, New York, NY (US)

(72) Inventors: Lakshminarasimhan Sethumadhavan, Niskayuna, NY (US); Adam Waksman, Pleasantville, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,763

(22) Filed: Jul. 20, 2018

(65) Prior Publication Data

US 2019/0213331 A1 Jul. 11, 2019

Related U.S. Application Data

(63) Continuation of application No. 15/105,087, filed as application No. PCT/US2014/071428 on Dec. 19, 2014, now Pat. No. 10,055,587.

(Continued)

(51) Int. Cl.
*G06F 21/57* (2013.01)
*G06F 21/87* (2013.01)

(52) U.S. Cl.
CPC .............. *G06F 21/57* (2013.01); *G06F 21/87* (2013.01); *G06F 2221/034* (2013.01)

(58) Field of Classification Search
CPC ........ G06F 21/57; G06F 21/577; G06F 21/85; G06F 21/87; G06F 21/88
See application file for complete search history.

(56) References Cited

U.S. PATENT DOCUMENTS 6,459,891 B1 10/2002 Whinnett et al.
7,656,189 B1 * 2/2010 Trimberger ............. G06F 21/76
326/21

(Continued)

FOREIGN PATENT DOCUMENTS

WO 20130044384 4/2013
WO 20130172913 11/2013

(Continued)

OTHER PUBLICATIONS

2012 IEEE International Symposium on Hardware-Oriented Security and Trust, HOST 2012, San Francisco, CA, USA, Jun. 3-4, 2012. IEEE, 2012.

(Continued)

*Primary Examiner* — David J Pearson
(74) *Attorney, Agent, or Firm* — Occhiuti & Rohlicek LLP

(57) ABSTRACT

Disclosed are devices, systems, apparatus, methods, products, media and other implementations, including a method that includes triggering a beacon circuit combined with a hardware-based protection module, included within a hardware device, the hardware-based protection module configured to provide protection against malicious implementations within the hardware device, with the beacon circuit being configured to provide a beacon output when triggered. The method further includes determining based on the beacon output provided by the triggered beacon circuit whether the hardware device includes at least one malicious implementation.

16 Claims, 13 Drawing Sheets

Related U.S. Application Data

(60) Provisional application No. 61/920,384, filed on Dec. 23, 2013.

(56) References Cited

U.S. PATENT DOCUMENTS

| | | | | |
|---|---|---|---|---|
| 10,055,587 | B2* | 8/2018 | Sethumadhavan | G06F 21/57 |
| 2003/0149914 | A1* | 8/2003 | Kim | G06F 21/87 |
| | | | | 714/30 |
| 2004/0064457 | A1 | 4/2004 | Zimmer et al. | |
| 2006/0028219 | A1 | 2/2006 | McDowell et al. | |
| 2007/0011744 | A1 | 1/2007 | Carothers et al. | |
| 2008/0005797 | A1 | 1/2008 | Field et al. | |
| 2009/0100518 | A1 | 4/2009 | Overcash | |
| 2009/0171480 | A1 | 7/2009 | Weber | |
| 2010/0332851 | A1* | 12/2010 | Priel | G06F 21/554 |
| | | | | 713/189 |
| 2011/0113392 | A1* | 5/2011 | Chakraborty | G06F 17/505 |
| | | | | 716/102 |
| 2011/0154501 | A1 | 6/2011 | Banginwar et al. | |
| 2012/0102334 | A1 | 4/2012 | O'Loughlin et al. | |
| 2012/0124393 | A1 | 5/2012 | Sethumadhavan et al. | |
| 2012/0278893 | A1* | 11/2012 | Jyothi | G06F 21/566 |
| | | | | 726/24 |
| 2013/0019305 | A1 | 1/2013 | Berenbaum et al. | |
| 2013/0061322 | A1 | 3/2013 | Sethumadhavan et al. | |
| 2014/0108786 | A1* | 4/2014 | Kreft | G06F 21/71 |
| | | | | 713/156 |
| 2016/0342777 | A1* | 11/2016 | Sadhasivan | G06F 21/14 |

FOREIGN PATENT DOCUMENTS

| | | |
|---|---|---|
| WO | 20140137416 | 9/2014 |
| WO | 20140152469 | 9/2014 |

OTHER PUBLICATIONS

2013 IEEE International Symposium on Hardware-Oriented Security and Trust, HOST 2013, Austin, TX, USA, Jun. 2-3, 2013. IEEE, 2013.
Abdel-Hamid, Sofi' ene Tahar, and El Mostapha Aboulhamid, "Finite State Machine IP Watermarking: A Tutorial." in AHS, pp. 457-464, 2006.
Abdel-hamid, Sofine Tahar, and El Mostapha Aboulhamid, "IP Watermarking Techniques: Survey and Comparison." In IEEE International Workshop on Systemon-Chip for Real-Time Applications, 2003.
Agrawal, Selc,uk Baktir, Deniz Karakoyunlu, Pankaj Rohatgi, and Berk Sunar, "Trojan Detection using IC Fingerprinting." In IEEE Symposium on Security and Privacy, pp. 296-310, 2007
Banga and Michael S. Hsiao, "A region based approach for the identification of hardware trojans." Hardware-Oriented Security and Trust, 2008. HOST '08. IEEE International Workshop on, Jun. 2008.
Barak, Oded Goldreich, Russell Impagliazzo, Steven Rudich, Amit Sahai, Salil P. Vadhan, and Ke Yang, "On the (Im) possibility of Obfuscating Programs." In Proceedings of the 21st Annual International Cryptology Conference on Advances in Cryptology, CRYPTO '01, pp. 1-18, London, UK, UK, 2001.
Becker, M. Kasper, A. Moradi, and C. Paar, "Sidechannel Based Watermarks for Integrated Circuits." In Hardware-Oriented Security and Trust (HOST), 2010 IEEE International Symposium on, pp. 30-35, Jun. 2010.
Becker, Francesco Regazzoni, Christof Paar, and Wayne P. Burleson, Stealthy Dopant-Level Hardware Trojans. In CHES, pp. 197-214, 2013.
Bellare, Viet Tung Hoang, and Phillip Rogaway, "Foundations of Garbled Circuits." In Proceedings of the 2012 ACM conference on Computer and Communications Security, CCS '12, pp. 784-796, New York, NY, USA.

Bilzor, T. Huffmire, C. Irvine, and T. Levin, "Evaluating Security Requirements in a General-Purpose Processor by Combining Assertion Checkers with Code Coverage." In Hardware-Oriented Security and Trust (HOST), 2012 IEEE International Symposium on, pp. 49-54, 2012.
Bitansky and Omer Paneth, "On the Impossibility of Approximate Obfuscation and Applications to Resettable Cryptography." In STOC, pp. 241-250, 2013.
Brzozowski and Vyacheslav N. Yarmolik, "Obfuscation as intellectual rights protection in vhdl language." In Proceedings of the 6th International Conference on Computer Information Systems and Industrial Management Applications, CISIM '07, pp. 337-340, Washington, DC, USA, 2007. IEEE Computer Society.
Chakraborty and Swarup Bhunia,Hardware Protection and Authentication through Netlist Level Obfuscation. In Proceedings of the 2008 IEEE/ACM International Conference on Computer-Aided Design, ICCAD'08, pp. 674-677, Piscataway, NJ, USA, 2008. IEEE Press.
Chakraborty and Swarup Bhunia, "Security through Obscurity: An approach for Protecting Register Transfer Level Hardware IP." In Proceedings of the 2009 IEEE International Workshop on Hardware-Oriented Security and Trust, HST '09, pp. 96-99, Washington, DC, USA, 2009. IEEE Computer Society.
Chakraborty, S. Bhunia, "Security Against Hardware Trojan Attacks Using Key-Based Design Obfuscation." Journal of Electronic Testing vol. 27/Issue 6 pp. 767-785 Dec. 2011.
Chapman, T.S. Durrani, and A. P. Tarbert, "Watermarking DSP Algorithms for System on Chip Implementation." In Electronics, Circuits and Systems, 1999. Proceedings of ICECS '99. The 6th IEEE International Conferenceon, vol. 1, pp. 377-380 vol. 1, 1999.
Chapman and T.S. Durrani, "IP Protection of DSP Algorithms for System on Chip Implementation." Signal Processing, IEEE Transactions on, 48(3):854-861, Mar. 2000.
Choudhary, S.V. Wadhavkar, T.A. Shah, H. Mayukh,J. Gandhi, B.H. Dwiel, S. Navada, H.H. Najaf-abadi, and E. Rotenberg, "Fabscalar: Composing Synthesizable RTL Designs of Arbitrary Cores within a Canonical Superscalar Template." In Computer Architecture (ISCA), 2011 38th Annual International Symposium on, pp. 11-22. IEEE, 2011.
Ferraiuolo, Xuehui Zhang, and Mohammad Tehranipoor. "Experimental analysis of a ring oscillator network for hardware trojan detection in a 90nm asic." ICCAD, pp. 37-42, 2012.
Gentry, "Computing Arbitrary Functions of Encrypted Data." Commun. ACM, 53(3):97-105, 2010.
Goering, Richard, "Software Engineering Firm Obfuscates Verilog." 2003.
Helfmeier, Dmitry Nedospasov, Christopher Tarnovsky, Jan Krissler, Christian Boit, and Seifert Jean-Pierre, "Breaking and Entering Through the Silicon." Proceedings of the 2013 ACM conference on Computer and Communications Security, CCS '13, 2013.
Hicks, Samuel T. King, Milo M. K. Martin, and Jonathan M. Smith, "Overcoming an untrusted computing base: Detecting and removing malicious hardware automatically." In Proceedings of the 31st IEEE Symposium on Security and Privacy, 2010.
Hohenberger, Guy N. Rothblum, Abhi Shelat, and Vinod Vaikuntanathan, "Securely Obfuscating Reencryption." In Proceedings of the 4th conference on Theory of cryptography, TCC'07, pp. 233-252, Berlin, Heidelberg, 2007. Springer-Verlag.
Hu, Abdullah Nazma Nowroz, Sherief Reda, and Farinaz Koushanfar, "High-Sensitivity Hardware Trojan Detection using Multimodal Characterization." In DATE, pp. 1271-1276, 2013.
Huffmire, B. Brotherton, Gang Wang, T. Sherwood, R. Kastner, T. Levin, T. Nguyen, and C. Irvine, "Moats and Drawbridges: An Isolation Primitive for Reconfigurable Hardware Based Systems." In Security and Privacy, 2007. SP '07. IEEE Symposium on, pp. 281-295, May 2007.
Jin and Yiorgos Makris, "Hardware trojan detection using path delay fingerpring." In Hardware-Oriented Security and Trust, 2008. HOST '08. IEEE International Workshop on, Jun. 2008.
Kahng, John Lach, William H. Mangionesmith, Stefanus Mantik, Student Member, Igor L. Markov, Miodrag Potkonjak, Paul Tucker, Huijuan Wang, and Gregory Wolfe, "Constraint-based Watermark-

(56) References Cited

OTHER PUBLICATIONS ing Techniques for Design IP Protection." IEEE Trans. Computer-Aided Design Integrated Circuits Systems, 20:1236-1252, 2001.
King, Joseph Tucek, Anthony Cozzie, Chris Grier, Weihang Jiang, and Yuanyuan Zhou. Designing and Implementing Malicious Hardware. In Proceedings of the 1st Usenix Workshop on Large-Scale Exploits and Emergent Threats, pp. 5:1-5:8, Berkeley, CA, USA, 2008. USENIX Association.
Koushanfar and Yousra Alkabani. Provably secure obfuscation of diverse watermarks for sequential circuits. In HOST, pp. 42-47, 2010.
Molho, Lee M. "Hardware Aspects of Secure Computing." In Proceedings of the May 5-7, 1970, Spring Joint Computer Conference, AFIPS '70 (Spring), pp. 135-141, New York, NY, USA, 1970. ACM.
Narasimhan, W. Yueh, X. Wang, S. Mukhopadhyay, and S. Bhunia, "Improving IC Security against Trojan Attacks through Integration of Security Monitors." Design Test of Computers, IEEE, PP (99):1, 2012.
Rajendran, Youngok Pino, Ozgur Sinanoglu, and Ramesh Karri, "Security Analysis of Logic Obfuscation." Proceedings of the 49th Annual Design Automation Conference, DAC '12, pp. 83-89, New York, NY, USA, 2012. ACM.
Rajendran, Michael Sam, Ozgur Sinanoglu, and Ramesh Karri, "Security Analysis of Integrated Circuit Camouflaging." In Proceedings of the 20th ACM Conference on Computer and Communications Security, CCS '13. ACM, 2013.
Roy, Farinaz Koushanfar, and Igor L. Markov, "EPIC: Ending Piracy of Integrated Circuits." Design, Automation & Test in Europe Conference & Exhibition, 0:1069-1074, 2008.
Salmani and Mohammad Tehranipoor, "Analyzing circuit vulnerability to hardware Trojan insertion at the behavioral level." In DFT, pp. 190-195, 2013.
Simonite, Tom "NSA's Own Hardware Backdoors May Still Be a Problem From Hell." MIT Technology Review, Oct. 2013.
Sturton, Matthew Hicks, David Wagner, and Samuel T. King, "Defeating UCI: Building Stealthy and Malicious Hardware." In Proceedings of the 2011 IEEE Symposium on Security and Privacy, SP '11, pp. 64-77, Washington, DC, USA, 2011. IEEE Computer Society.
Valamehr, Melissa Chase, Seny Kamara, Andrew Putnam, Dan Shumow, Vinod Vaikuntanathan, and Timothy Sherwood, "Inspection Resistant Memory: Architectural Support for Security from Physical Examination." In Proceedings of the 39th Annual International Symposium on Computer Architecture, ISCA '12, pp. 130-141, Washington, DC, USA, 2012. IEEE Computer Society.
Villasenor. The Hacker in Your Hardware: The Next Security Threat. Scientific American. Aug. 4, 2010.
Waksman, and Simha Sethumadhavan, "Tamper Evident Microprocessors." In Proceedings of the 31st IEEE Symposium on Security and Privacy, 2010.
Waksman and Simha Sethumadhavan, "Silencing Hardware Backdoors." In Proceedings of the 2011 IEEE Symposium on Security and Privacy, SP '11, pp. 49-63, Washington, DC, USA, 2011. IEEE Computer Society.
Waksman, J. Eum, and S. Sethumadhavan, "Practical, Lightweight Secure Inclusion of Third-Party Intellectual Property." In Design and Test, IEEE, 2013.
Waksman, Matthew Suozzo, and Simha Sethumadhavan, "FANCI: Identification of Stealthy Malicious Logic Using Boolean Functional Analysis." In Proceedings of the 20th ACM Conference on Computer and Communications Security, CCS '13. ACM, 2013.
Wei, Kai Li, Farinaz Koushanfar, and Miodrag Potkonjak, "Provably Complete Hardware Trojan Detection Using Test Point Insertion." In Proceedings of the International Conference on Computer-Aided Design, ICCAD '12, pp. 569-576, New York, NY, USA, 2012. ACM.
Wei and Miodrag Potkonjak, "Malicious circuitry detection using fast timing characterization via test points." 2013 IEEE International Symposium on Hardware-Oriented Security and Trust (HOST), 0:113-118, 2013.
Zhang, Andrew Ferraiuolo, and Mohammad Tehranipoor, "Detection of trojans using a combined ring oscillator network and off-chip transient power analysis." JETC, 9(3):25, 2013.

\* cited by examiner

TABLE I

SPECIFICATIONS FOR THE TWO CHOSEN FABSCALAR CORES

| Core Type | Out-of-Order | Fetch Width | Fetch Depth | Execution Units | Issue Queue Size |
|---|---|---|---|---|---|
| Small | Yes | 1 | 1 | 4 | 32 |
| Large | Yes | 6 | 2 | 6 | 64 |

IMPLEMENTATIONS TO FACILITATE HARDWARE TRUST AND SECURITY

CROSS-REFERENCE TO RELATED APPLICATIONS

This application is a continuation application of U.S. patent application Ser. No. 15/105,087, filed Jun. 16, 2016, which is a § 371 National Stage of International Application No. PCT/US2014/071428 filed on Dec. 19, 2014, which claims the benefit of, and priority to provisional U.S. application Ser. No. 61/920,384, entitled "A UNIFIED APPROACH TO HARDWARE TRUST AND SECURITY," and filed Dec. 23, 2013, the content of which is incorporated herein by reference in its entirety.

STATEMENT REGARDING FEDERALLY SPONSORED RESEARCH

This invention was made with government support under FA 865011C7190 and FA 87501020253, both awarded by the Defense Advanced Research Projects Agency (DARPA), and under Grant No. 1054844 by the National Science Foundation (NSF). The government has certain rights in the invention.

BACKGROUND

Security is a full-system property. All components in a system, including the hardware, should be secured to create a trustworthy system. While software attacks and defenses have received much attention for decades, the dangers of hardware vulnerabilities have only recently been given serious attention. There is considerable concern that malicious designs can be produced. Additionally, once designs are sent for manufacturing, adversaries may modify the manufacturing blueprint to include malicious circuits that can exfiltrate sensitive information or cause the design to fail in unexpected ways.

Companies buying intellectual property (such as encryption devices, USB or SATA controllers) from third-party vendors to integrate them into their designs worry that these third-party components may have embedded backdoors. These backdoors may exist in the source code and be turned on after deployment to siphon off secrets, or to perform other malicious activities. Backdoors injected by the foundry, such as erroneous dopant levels, can cause malicious payloads, such as poor quality pseudo-random numbers. An advantage of foundry-level attack is that there is little oversight over the manufacturing process. Both the design and manufacturing of hardware pose security risks, which, if unmitigated, impair the ability to create and protect systems.

SUMMARY

In some variations, a method is provided that includes triggering a beacon circuit combined with a hardware-based protection module, included within a hardware device, the hardware-based protection module configured to provide protection against malicious implementations within the hardware device, with the beacon circuit being configured to provide a beacon output when triggered. The method further includes determining based on the beacon output provided by the triggered beacon circuit whether the hardware device includes at least one malicious implementation.

Embodiments of the method may include at least some of the features described in the present disclosure, including one or more of the following features.

Determining whether the hardware device includes the at least one malicious implementation may include determining if the beacon output provided by the triggered beacon circuit matches a pre-determined beacon output.

The beacon output may include one or more of, for example, an output power profile produced by the beacon circuit, and/or a digital output.

The output power profile may be produced by a plurality of power producing circuits, with each of the plurality of power producing circuits comprising one or more logic gates.

The plurality of power producing circuits may include a plurality of pseudo-random logic blocks, each of depth one, with each of the plurality of pseudo-random logic blocks being tiled next to another of the plurality of pseudo-random logic blocks to form a grid of logic blocks.

Triggering the beacon circuit may include receiving an input trigger key, and triggering the beacon circuit in response to a determination that the received input trigger key matches a pre-determined beacon key, $K_B$, associated with the beacon circuit.

The method may further include activating the beacon circuit and the protection module in response to receiving, at the hardware device, a pre-determined activation key $K_A$, the beacon circuit and the hardware-based protection module of the hardware device configured to recognize the pre-determined activation key $K_A$.

Triggering the beacon circuit may include triggering the beacon circuit subsequent to activation of the beacon circuit and the hardware-based protection module with the pre-determined activation key $K_A$.

The method may further include activating one or more modules of the hardware device in response to receiving, at the hardware device, a pre-determined module activation key $K_M$ derived based on the pre-determined activation key $K_A$. The one or more modules of the hardware device may be configured to recognize the pre-determined module activation key $K_M$.

The method may further include measuring the beacon output provided by the triggered beacon circuit using one or more of, for example, a current sensor, a voltage sensor, an infrared sensor, and/or a probe to detect digital output.

In some variations, a system is disclosed that includes a hardware device including a hardware-based protection module, configured to provide protection against malicious implementations within the hardware device, that is combined with a beacon circuit configured to provide a beacon output when triggered. The system further includes a controller configured to, when operating, cause operations that include triggering the beacon circuit combined with the hardware-based protection module included within the hardware device, and determining based on the beacon output provided by the triggered beacon circuit whether the hardware device includes at least one malicious implementation Embodiments of the system may include at least some of the features described in the present disclosure, including at least some of the features described above in relation to the method, as well as one or more of the following features.

Determining whether the hardware device includes the at least one malicious implementation may include determining if the beacon output provided by the triggered beacon circuit matches a pre-determined beacon output.

The beacon output may include one or more of, for example, an output power profile produced by the beacon circuit, and/or a digital output. The output power profile may be produced by a plurality of pseudo-random logic blocks, each of the plurality of pseudo-random logic blocks being of depth one and comprising one or more logic gates, with the each of plurality of pseudo-random logic blocks being tiled next to another of the plurality of pseudo-random logic blocks to form a grid of logic blocks.

The controller may be further configured to cause further operations including transmitting an input trigger key, with the beacon circuit being configured to be triggered in response to a determination that the transmitted input trigger key received by the hardware device matches a pre-determined beacon key, $K_B$, associated with the beacon circuit.

The controller may be further configured to cause further operations including transmitting a pre-determined activation key $K_A$, with the beacon circuit and the protection module being configured to be activated in response to receiving and recognizing, at the hardware device, the pre-determined activation key $K_A$.

Triggering the beacon circuit may include triggering the beacon circuit subsequent to activation of the beacon circuit and the hardware-based protection module with the pre-determined activation key $K_A$.

The one or more modules of the hardware device may be configured to be activated in response to receiving and recognizing, at the hardware device, a pre-determined module activation key $K_M$ derived based on the pre-determined activation key $K_A$.

The system may further include measurement apparatus to measure the beacon output provided by the triggered beacon circuit. The measurement apparatus may include one or more of, for example, a current sensor, a voltage sensor, an infrared sensor, and/or a probe to detect digital output.

In some variations, an additional method is disclosed that includes combining a beacon circuit with a protection module configured to provide protection against malicious implementations within a device, with the beacon circuit being configured to provide a beacon output when triggered. The additional method further includes producing the beacon circuit combined with the protection module included within the device as a hardware implementation, the hardware implementation configured to enable determination, based on the beacon output produced when the beacon circuit is triggered, whether the hardware implementation includes at least one malicious implementation.

Embodiments of the additional method may include at least some of the features described in the present disclosure, including at least some of the features described above in relation to the first method and the system, as well as one or more of the following features.

The beacon circuit may include a plurality of pseudo-random logic blocks, each of the plurality of pseudo-random logic blocks being of depth one and comprising one or more logic gates, with the each of plurality of pseudo-random logic blocks being tiled next to another of the plurality of pseudo-random logic blocks to form a grid of logic blocks.

Producing the beacon circuit combined with the protection module included within the device as the hardware implementation may include producing the hardware implementation such that the protection module and the beacon circuit combined with the protection module are activated when a pre-determined activation key, $K_A$, is provided to the hardware implementation.

The beacon circuit may be configured to be triggered subsequent to activation of the beacon circuit and the protection module with the pre-determined activation key $K_A$.

Producing the beacon circuit combined with the protection module included within the device as the hardware implementation may further include producing the hardware implementation such that one or more modules of the device are activated when a pre-determined activation key, $K_M$, derived based on the pre-determined activation key $K_A$, is provided to the hardware implementation.

In some variations, a hardware device is disclosed that includes one or more modules to perform pre-specified operations, one or more protection modules configured to provide protection against potential malicious implementations within the hardware device, and one or more beacon circuits combined with the one or more protection modules. Each of the one or more beacon circuits is configured to provide a corresponding beacon output when triggered to facilitate determination of whether the hardware device includes at least one malicious implementation.

Embodiments of the hardware device may include at least some of the features described in the present disclosure, including at least some of the features described above in relation to the methods and the system, as well as one or more of the following features.

The corresponding beacon output for the each of the one or more beacon circuits may include one or more of, for example, an output power profile produced by the beacon circuit, and/or a digital output.

At least one of the one or more beacon circuits may include a plurality of pseudo-random logic blocks, each of the plurality of pseudo-random logic blocks being of depth one and comprising one or more logic gates, with the each of the plurality of pseudo-random logic blocks being tiled next to another of the plurality of pseudo-random logic blocks to form a grid of logic blocks.

The each of the one or more beacon circuits may be configured to provide the corresponding beacon output when triggered in response to a determination that a received input trigger key matches a pre-determined beacon key, $K_B$, associated with the respective each of the one or more beacon circuits.

The one or more beacon circuits and the one or more protection modules may be configured to be activated in response to receiving, at the hardware device, a pre-determined activation key $K_A$, associated with the hardware device.

Each of the one or more beacon circuits may be configured to be triggered subsequent to activation of the each of the one or more beacon circuits and the one or more hardware-based protection modules with the pre-determined activation key $K_A$.

The one or more modules of the hardware device may be configured to be activated in response to receiving, at the hardware device, a pre-determined module activation key $K_M$ derived based on the pre-determined activation key $K_A$.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, is meant to encompass variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, is also meant to encompass variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Details of one or more implementations are set forth in the accompanying drawings and in the description below. Further features, aspects, and advantages will become apparent from the description, the drawings, and the claims.

BRIEF DESCRIPTION OF THE DRAWINGS

These and other aspects will now be described in detail with reference to the following drawings.

Like reference symbols in the various drawings indicate like elements.

DESCRIPTION

Figure 1:
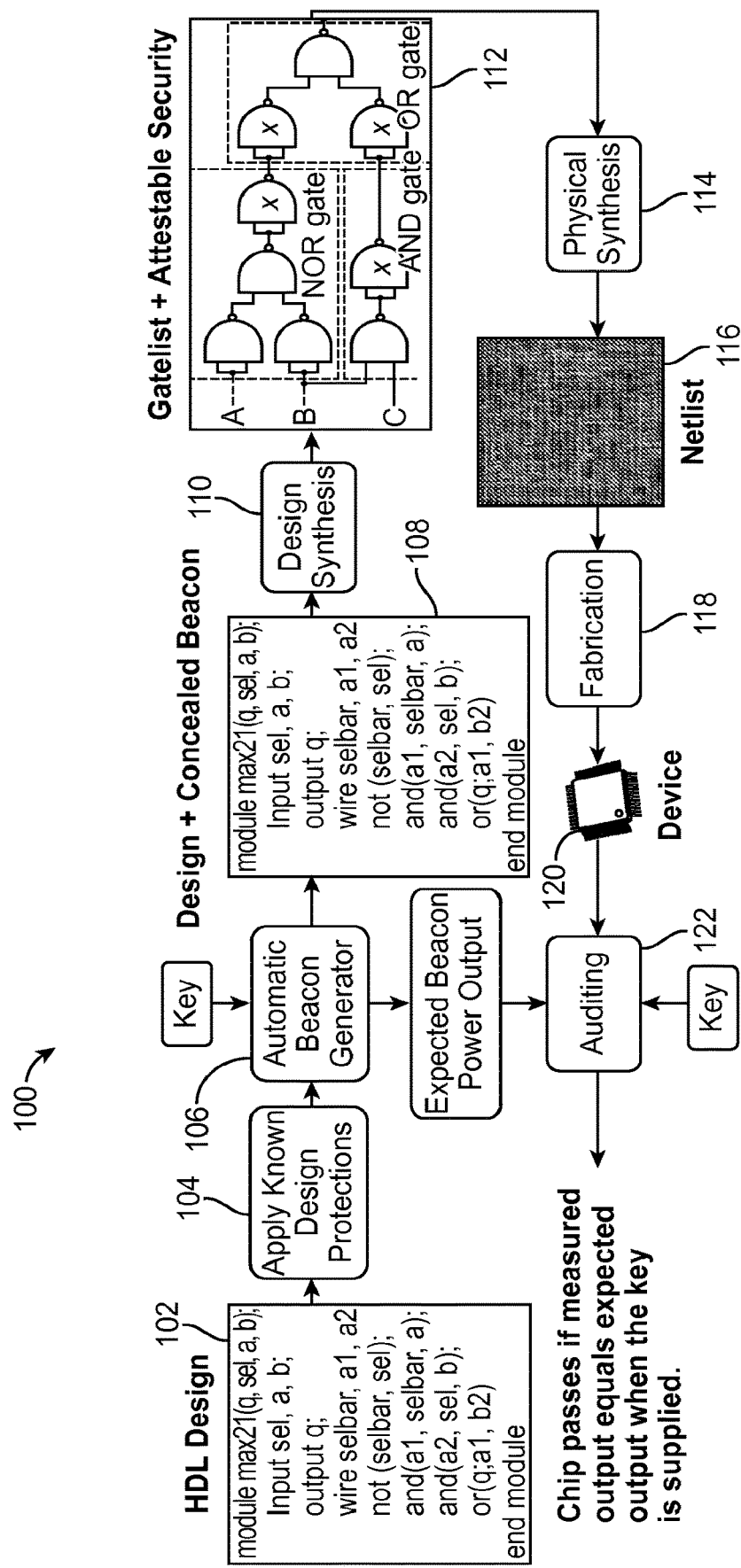
FIG. 1 is a flow diagram illustrating the various stages in an example process to embed a beacon circuit into a hardware implementation for a circuit design.

Described herein are systems, devices, apparatus, methods, computer program products, media, and other implementations to protect against, and counter, malicious hardware implementations by incorporating into a protection module (e.g., a hardware-based protection module included in a hardware device with one or more untrusted modules) a beacon circuit that can be used to indicate if an integrated circuit manufacturer (i.e., a foundry manufacturing chips according to designs provided by contracting parties) attempted to tamper with the protection module (e.g., to disable, remove, or otherwise circumvent the protection module). Thus, given a hardware security protection technique, P, that is applied to a hardware design D, the presence of P in D can be assured, in the embodiments described herein, even when the design is manufactured by a malicious foundry. To that end, in some embodiments, an output attestation mechanism (e.g., a power-based attestation mechanism), referred to as a beacon, is implemented which is built/incorporated into P and entangled so that it cannot be easily removed by a foundry (or some other third party) without destroying the beacon's unique output (e.g., power signature). After fabrication, if this security attestation beacon is missing or produces the wrong output, the design can be assumed to have been compromised.

Attacking and defending against hardware backdoors can sometimes be viewed as a game where the player who takes the last turn usually wins. For all known backdoor (digital or analog) types, there are generally defensive mechanisms (e.g., circuits) that can detect them. At the same time, for known defensive circuits, there are ways for a malicious foundry or some other adversary to circumvent them. Thus, often, whoever gets to change or control the hardware last before it reaches the market will prevail. Therefore, to build secure hardware, the last turn should be taken by a trusted auditor, and the hardware should be able to attest to its own trustworthiness. In the implementations described herein, the threat model assumed is one that included malicious designers and/or a malicious foundry seeking to introduce backdoors, and in which a goal of a malicious foundry is to remove protection mechanisms. For example, if a third-party foundry knows what a design (of a developing party seeking to obtain a hardware realization for its intended implementation) looked like prior to the addition of protection circuits, the foundry can produce a malicious or counterfeit chip that lacks those protections. As a defender (namely a company or government that wants to produce backdoor-free hardware) the goal is two-fold:

1) To ensure that design protections can be attested to, thus ensuring that the last turn in the game is taken by the defense. In some embodiments, this may be achieved via power attestation modules.
2) To prevent the attestation and defensive circuits from being disentangled in a netlist (or gatelist). This goal is necessary because if an intelligent attacker can reverse engineer semantics and keys from the gatelist, then the protection circuits can be disabled without breaking the attestation signature.

It is generally assumed that attackers have full knowledge of all defensive actions, and that attackers have access to state-of-the-art invasive techniques for reverse engineering chips. As we discussed in greater details below, these capabilities by the attackers do not generally matter against the beacon entanglement schemes described herein, which uses implicit keys, i.e., no hardware storage for keys.

Accordingly, in some embodiments, a method is provided that includes triggering a beacon circuit combined with a hardware-based protection module, included within a hardware device, the hardware-based protection module configured to provide protection against malicious implementations within the hardware device. The beacon circuit is configured to provide a beacon output when triggered. The method further includes determining based on the beacon output provided by the triggered beacon circuit whether the hardware device includes at least one malicious implementation. In some embodiments, the beacon output may include one or more of, for example, an output power profile produced by the hardware device, and/or a digital output. The output power profile may be produced by a plurality of power producing circuits, with each of the plurality of power producing circuits including one or more logic gates. In some embodiments, triggering the beacon circuit may include receiving an input digital key, and triggering the beacon circuit in response to a determination that the received input digital key matches a pre-determined trigger key (i.e., a beacon key) associated with the beacon circuit. In some embodiments, the beacon circuit and the protection module need to first be activated using a secret key (an activation key, $K_A$, different from the beacon key) before the beacon circuit can produce a beacon output in response to receiving the beacon key. In some embodiments, to enable the manufactured device, the untrusted modules are first activated using a module key, $K_M$, that is derived based on the activation key $K_A$.

Thus, in the methods, systems and other implementations described herein, a power attestation mechanism is combined to provide a unified framework with quantifiable guarantees. From a security standpoint, in the methods, systems, and other implementations described herein, the backdoor problem is effectively being turned on its head. For years, security engineers have been unable to reliably discover malicious modifications through inspection of netlists and chips. In order for attackers to disentangle the security mechanism from the beacon protections, they would have to solve this previously unsolved hard problem of reverse engineer semantics from a large netlist that has been obfuscated with key-based schemes. In the present implementations, the netlist is being obfuscated intentionally, making this already hard problem even harder for an attacker.

As will be described in greater details below, during testing performed for the methods, systems, and other implementations described herein, beacons were applied to three real-world digital hardware designs, namely, an AES unit and two processor cores. The testing showed that the beacons can be implemented efficiently, with little impact on timing, while having area and average power overheads that are reasonable (less than 1% changes in most cases). The methods, systems, and other implementations described herein enable addressing the issues/challenges of malicious attacks (such as backdoor attacks) in the entire hardware development process, and thus increase the practicality of applying hardware backdoor protections.

With reference to FIG. 1, a flow diagram illustrating the various stages in an example process 100 to embed a beacon circuit into a hardware implementation for a proposed circuit design in order to prevent/inhibit attacks by a third party (e.g., a foundry) is shown. Generally a developing/designing party prepares a high-level implementation of the required circuit which may be represented, for example, as a Hardware Description Language (HDL) representation 102. Other high-level realizations or representations (e.g., using such tools as Verilog, etc.) of the intended circuit of the developing party may also be used. Incorporated into the high-level representation of the intended implementation are one or more defense or protection mechanism/modules 104 configured to counter malicious attacks/implementations (e.g., backdoor implementations) by rogue parties seeking to compromise the integrity and/or functionality of the intended circuit implementation represented by the HDL description 102. Some examples of such one or more defense mechanisms/protection modules include a TrustNet mechanism, a trigger obfuscation mechanism, etc. Additional examples of defense mechanisms or protection modules to counter implementations of malicious attacks are described in patent publication Nos. WO 2014/152469 entitled "Unsupervised Anomaly-Based Malware Detection Using Hardware Features," WO 2014/149080 entitled "Detection of Anomalous Program Execution Using Hardware-Based Micro-Architectural Data," WO 2014/137416 entitled "Identification of Backdoors and Backdoor Triggers," WO 2013/172913 entitled "Systems and Methods to Counter Side Channels Attacks," US 2013/0061322 entitled "Systems and Methods for Detecting Design-Level Attacks Against a Digital Circuit," and US 2012/0124393 entitled "System and Methods for Silencing Hardware Backdoors," and in the publication "Overcoming an Untrusted Computing Base: Detecting and Removing Malicious Hardware Automatically" by Matthew Hicks et al., published in Security and Privacy (SP), 2010 IEEE Symposium on Security and Privacy, the contents of all of which are incorporated herein by reference in their entireties.

As will be described in greater details below, to prevent or inhibit a third-party foundry, tasked with producing the circuit realization of the intended implementation, from circumventing the protection modules 104 incorporated into the high-level description of the intended implementation, a beacon module, or circuit, 106 is combined with the protection module(s) in such a way that an attempt to remove, or otherwise tamper, with the protection module or the beacon circuit will result in modified operation of the protection module and/or the beacon circuit (thus alerting the developing party of an attempt to create a malicious vulnerability in the intended hardware implementation). For example, the beacon circuit may be configured to produce a unique pre-determined output upon being triggered (e.g., when provided with a trigger/beacon key) when there is no tampering with the protection module(s) or beacon circuit, but will produce a different output if some form of tampering has occurred. In some embodiments, the beacon circuit is configured to consume a known amount of power when supplied with a unique key, thus creating a unique power signature via a challenge-response mechanism. An auditor can check for the attestation after the chip is manufactured. The beacon circuit may be entangled with the high-level description of the intended implementation using, for example, a technique known as key-based obfuscation (with quantifiable guarantees) that prevent/inhibit an adversary from removing the defense circuit while leaving the beacon intact. The inclusion of a beacon circuit therefore removes the circular assumptions used in design-level and foundry-level backdoor security implementations.

Combining the beacon circuit (also referred to as an attestation circuit/module) with the protection module(s) produces in a resultant high-level description 108 that includes the combined/entangled beacon circuit. A design synthesis procedure 110 is applied to the high-level description (that includes the beacon circuit) to produce a gatelist representation 112 of the implementation (e.g., an implementation comprising a representation of the intended circuit implementation based on low-level logical constructs such AND, NOT, NOR, XOR gates). A physical synthesis process 114 is applied to the gatelist representation 112 (e.g., using a placement tool to place the standard cells onto a an ASIC layout) to produce a netlist 116, followed by a fabrication process 118 to realize the physical chip-based hardware implementation of the developing party's intended circuit. The manufactured device (an ASIC chip) may then be audited 122 by, for example, using an apparatus to apply to the manufactured device an input corresponding to the key associated with the beacon circuit entangled into the protection module(s) realized in the device, and to obtain the resultant output (e.g., measuring power consumed) to determine if the resultant output matches the expected output (e.g., whether a power signature or some digital output matches the expected power signature or expected digital output).

Figure 2:
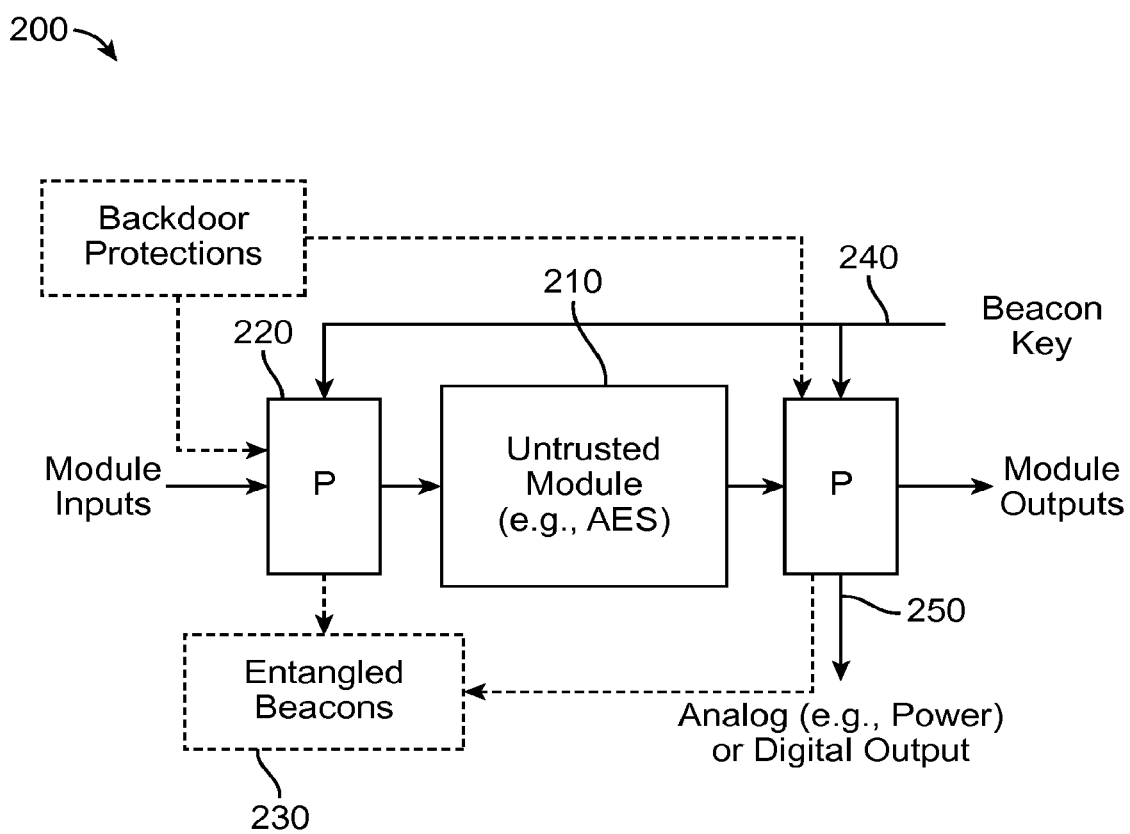
FIG. 2 is a schematic diagram illustrating a circuit-implementation with a beacon entangled protection module.

The beacon circuits of the implementations described herein may be, in some embodiments, a digitally controllable challenge/response circuit. The output of such a circuit is unpredictable to anyone except the owner of the key used to trigger the beacon. The response of the beacon can be either digital or analog (e.g., a power signature). FIG. 2 is a schematic diagram illustrating a circuit-implementation with a beacon entangled protection module. As shown, the circuit implementation 200 may include an untrusted module 210 (e.g., an AES, a processor core, etc.), and a protection module to guard again malicious attacks (e.g., backdoor attacks) that may be mounted through the untrusted module 210. The circuit implementation may therefore include a protection module 220 into which a beacon circuit/module 230 is entangled. The beacon circuit combined with the protection module is configured to receive, during its normal course of operation, an input 240 (corresponding to a beacon key) to trigger generation of a beacon output used to determine the existence or occurrence of a malicious attack. Comparison of the generated output to expected output will indicate whether tampering (e.g., to circumvent in some way the protection module 220) has occurred.

In some embodiments, the beacon circuit may be configured to generate an analog side-channel beacon. An analog side-channel beacon is a substantial and predictable side-channel emanation caused by a digital input. It can be thought of as a spot on the chip that can be intentionally made hot under controlled circumstances. The side-channel emanation should be easy to measure and reliable in its values. Side-channel emanations may be measured using, for example, current or voltage meters, infrared sensors, etc. An analog beacon signature may be a power-produced power signature, that generally satisfies the following requirements:

Average power usage of the implementation should not be impacted by the inclusion of beacons.

Peak power constraints of the implementation should not be violated by beacons. The difference between power usage when a beacon is on versus when it is off should be reliably measurable, and thus should be large with respect to the total power of the system; too large to be by accident (e.g., process variations) or to go undetected.

The trigger for the beacons should be an unlikely input to prevent a third-party rogue foundry from guessing the trigger to learn and replay the expected power output.

In some embodiments, an analog-based beacon signature may be a digitally-triggered circuit that raises power by a substantial amount that is at most the difference between average and peak power. The triggered execution aspect of the beacon may be functionally similar to a typical backdoor, even though it would be used benignly for the purposes of security. The digitally-triggered beacon-circuit implementations described herein should meet the above-identified requirements as follows:

Average power is unaffected because the beacon, being a key-enabled circuit, only needs to be on for a controlled and small number of cycles. During normal operation the beacon is off.

The beacon raises power usage from average power to a controlled level above average that is at most peak power.

The difference in power is on the order of the difference between peak and average, which in any realistic system is large and readily measurable. This difference can be chosen to be smaller if desirable as long as it is big enough to be observable.

The trigger for the beacon (just like a trigger for a backdoor) can evade detection. The beacon is applied after backdoor defensive mechanisms are in place and is thus unaffected by the defensive mechanisms themselves. A beacon can be thought of as a beneficial backdoor applied by the last actor in the design process.

A digital beacon is the same concept as the analog one but with digital outputs instead of side-channel emanations. It is an intentional backdoor that outputs a signal (e.g., a '1') when it sees a special key and a different signal (e.g., a '0') for all other possible values. There are nearly unlimited ways in which a digital beacon output can be relayed to the auditor. It could be placed into a pre-chosen register, put in memory, sent out directly through a pin, or made externally visible through any other number of ways. The trade-off between the digital approach and the analog side-channel approach exists in detectability for both the attacker (malicious foundry) and the auditor. The digital approach is more easy to detect, thus making it easier to implement, but easier for an attacker to circumvent. Using a digital output might offer the attacker the possibility to backtrace from the output pin to identify some of the logic. Such a method would generally not be possible in the case of an analog side-channel beacon, because the side-channel beacon does not generally connect to any output pins.

Figure 3:
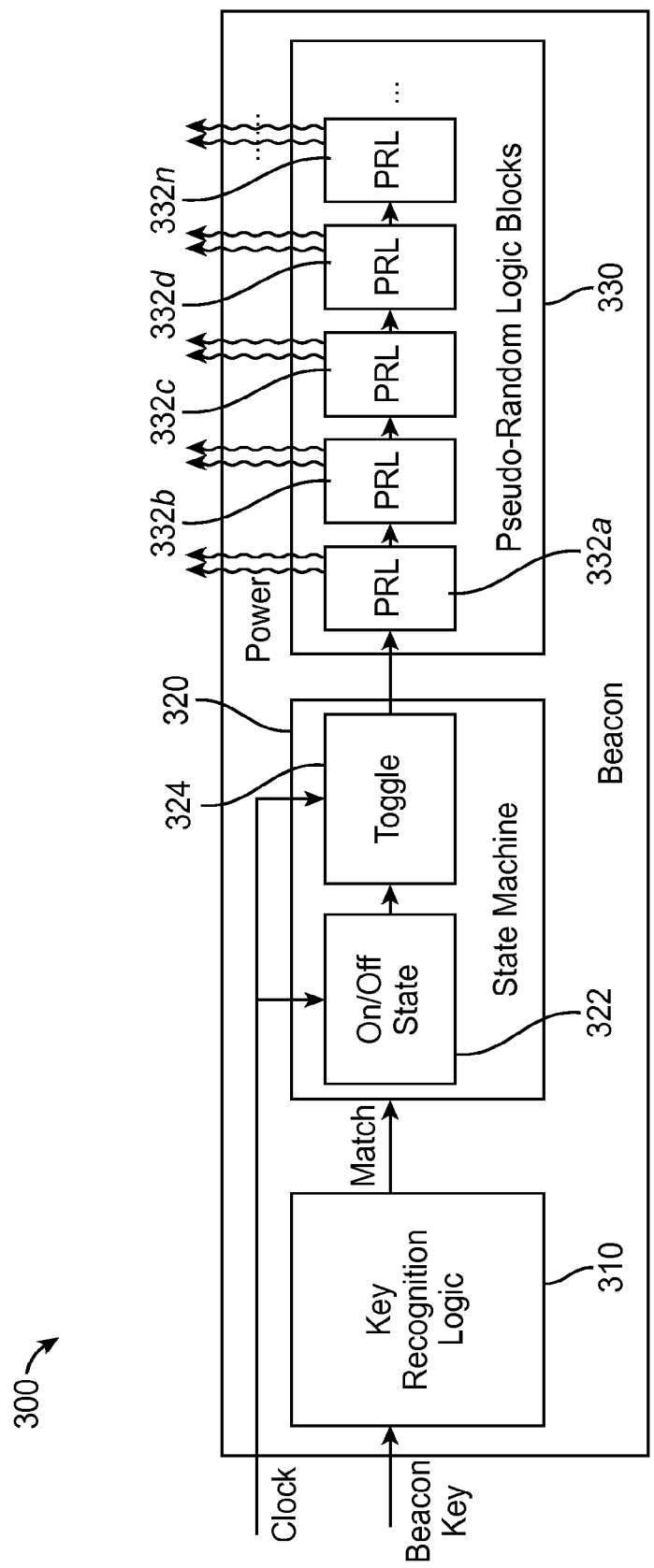
FIG. 3 is a schematic diagram of an example beacon circuit.

There are many ways in which a beacon circuit may be implemented. By varying the choice of logic gates (AND, OR, etc.) used to realize the beacon circuit, the functionality required of the beacon can be provided in exponentially many different ways. FIG. 3 illustrates an example embodiment of a beacon circuit 300. The beacon circuit 300 includes key recognition logic 310 configured to detect when an auditing key has arrived as an input. In some embodiments, the logic 310 may be implemented as a comparator that has been obfuscated (as will be discussed below in greater details). As further shown, the beacon circuit 300 also includes a state machine controller 320 configured to, in response to determination that input provided to the key recognition logic 310 matches the predetermined key associated with the circuit 310, to control operation of the beacon circuit output module 330. In some embodiments, the beacon output module 330 may include one or more pseudo-random logic blocks (PRL) 332a-n. In some implementations, the one or more PRLs 332a-n may be realized as circuits of depth one (1) with an array of logic gates that are fed inputs and give outputs in parallel.

To construct a beacon output circuit (e.g., a circuit configured to output a particular pre-determined power signature), multiple PRLs may be tiled next to each other to form a grid of logic blocks. Each PRL passes along the input signal through randomly chosen logic blocks. In some embodiments, each pair of adjacent PRLs forms a bipartite graph, where each edge either exists or does not exist based on a pseudo-random decision based on the secret key (the connections may be formed during hardware synthesis). Upon triggering of the beacon circuit (e.g., when the key recognition logic 310 determines that there is a match between the key input provided and the pre-determined key associated with the beacon circuit), an On/Off module 322 of the state machine controller 320 turns on (e.g., switches from 0 to 1), thus causing a toggle switch module/circuit 324 to toggle at, for example, every clock cycle (or at some other interval, such as every 2, 5, 10, etc., clock cycles). The activated toggle switch circuit broadcasts a bit (or bits) to the first PRL (e.g., the PRL 332a of the example circuit of FIG. 3). In embodiments in which the PRL's are circuit realizations of, for example, NOT-gate constructions (or equivalents thereof), the initiating input signal of the beacon circuit causes a "see-saw" behavior in the operation of the grid of the PRL's 332a-n such that as the input signal from the toggle switch circuit 324 oscillates as it moves to downstream PRL's. For example, if the input signal provided to the first PRL is an all '1' signal, the input provided by the first PRL to the second PRL would be an all '0' signal, the input provide by the second PRL to the third PRL would be an all '1' signal, and so on. In such embodiments, when the toggle switch output flips, the PRL's that have been outputting an all '1' signal will output an all '0' signal, and vice versa.

While many types of power-signature-producing circuits may be used, an advantage of using PRL's blocks to output a power signature is that the activity factor for such circuit implementations is at, or near, 1 (close to 100%; i.e., close to 100% of the circuit is active and generating power). The high activity factor enables PRL's to be 10 to 100 smaller than typical circuits that have a typical activity factor between around 0.01 to 0.1. A beacon circuit implemented with PRL's has fairly clear power costs. There is the leakage power (power consumed when the circuit is in standby) and the dynamic power (power consumed when the circuit is operational). For example, consider a beacon circuit (e.g., one similar to the implementation depicted in FIG. 3) that comprises two flip-flops and the PRL's used to generate the analog output signature. If a flip-flop has leakage F and a PRL has leakage P, then the total leakage for the beacon circuit is approximately 2F+NP, where N is the number of PRLs used. If each PRL has a maximum dynamic power consumption of D, then the power consumption while the beacon is active is approximately 2F+N(P+αD), where α is the activity factor. Because the desired beacon consumption compared to the leakage power should generally be large, the ratio of $$\frac{2F + N(P + \alpha D)}{2F + NP}$$

should, therefore, be made large. Two ways to make this ratio large are, for example, to make α (i.e., the activity factor) and/or D large. Thus, as described herein, making the activation factor α close to 100% in PRL implementations enables achieving a generally large power consumption ratio of $$\frac{2F + N(P + \alpha D)}{2F + NP}.$$

The actual power generated by the beacon circuit can also be controlled by controlling the size of the PRL grid (e.g., a larger PRL grid size will result in a larger power signature).

As noted, given a beacon circuit to attest to the security of a hardware device, the goal is to prevent or inhibit an intelligent attacker from undermining the beacon. Generally, without knowing/learning the trigger/beacon key for the beacon circuit, it is very difficult to fake the power signature. Thus, to circumvent a beacon circuit, an adversary would need to uncover the beacon key and create a fake beacon before or during fabrication. For this reason, recovering the key becomes an exercise in reverse engineering, because with a full understanding of the circuit at the most detailed level, an adversary can potentially guess the key. To inhibit an adversary's ability to reverse engineer and recover the trigger key for the beacon circuit, an example process, namely, Process 1 (presented as pseudo code), to combine a beacon(s) with a protection module(s) is provided below.

| Process 1: Combining beacons with protections and modules |
|---|
| 1: for all security-critical modules m do |
| 2:     $K_A \leftarrow$ Activation Key for m (public after fabrication) |
| 3:     $K_B \leftarrow$ Beacon Key (private) |
| 4:     $K_M \leftarrow$ Module Key (private) |
| 5:     B $\leftarrow$ newBeacon($K_A$,$K_B$) |
| 6:     Synthesize B |
| 7:     P $\leftarrow$ protection($K_A$) |
| 8:     Synthesize P ∪ B |
| 9:     for all bits w in $K_M$ do |
| 10:         w $\leftarrow$ randSelect(value(w), P, B) |
| 11:     end for |
| 12:     Synthesize P ∪ B ∪ M |
| 13: end for |

In Process 1, $K_A$ is an activation key that is kept private until after manufacturing is complete, at which point it can be loaded into firmware or distributed with the product. Once the manufacturing is complete, $K_A$ no longer has any need to be kept a secret. Without $K_A$, the behavior of the design is undefined. $K_B$ is the beacon key, which is a private key generally used only during auditing (i.e., post manufacturing) to turn on the beacon side-channel for attestation. Without $K_B$, the functionality of the beacon is undefined. $K_M$ is a private key that enables/activates the untrusted module (i.e., the target circuit/module with respect to which the protection module is being implemented or deployed). Without $K_M$, the behavior of the untrusted target module is undefined. $K_M$ is derived from $K_A$, and like $K_A$, $K_M$ should be kept secret prior to manufacture. After manufacture, it is acceptable for attackers to use chip-probing methods to uncover $K_M$, because it no longer has value at that point in time, as the device has already been manufactured.

At a high level, the beacon and protection module/circuit are entangled together, while the untrusted module can operate correctly only when a special key ($K_M$) is supplied to it. This module key, $K_M$, is generated only when both the beacon circuit and the protection module have not been tampered with in any way; entangling the beacon circuit and the protection module/circuit ensures that they cannot be separated by an adversary to leave the beacon intact without the protection.

To entangle two circuits, e.g., the beacon circuit and the protection module/circuit, in a way that is difficult for an adversary to separate them out (even when the adversary has complete access to the netlist), simple mixing may be dangerous. Particularly, a beacon circuit will be relatively dark (i.e., inactive) for all but one of an exponential number of possible inputs, while the protection circuit will ordinarily show some activity for all inputs. An adversary can try to take advantage of this difference to identify and snip out the protection circuit, leaving the beacon intact. One solution to this problem is to match the activity of the beacon with the activity of the protection circuit. In practice, this solution is hard to implement because the activity of the protection circuit depends on its inputs. To obtain the same activity for all possible inputs, the protection and beacon circuits would have to be functionally similar, which is not often the case. One can try to match the activities for many cases but any small difference in the unmatched cases may then be exploited by a sufficiently capable adversary to differentiate the two circuits.

Figure 4:
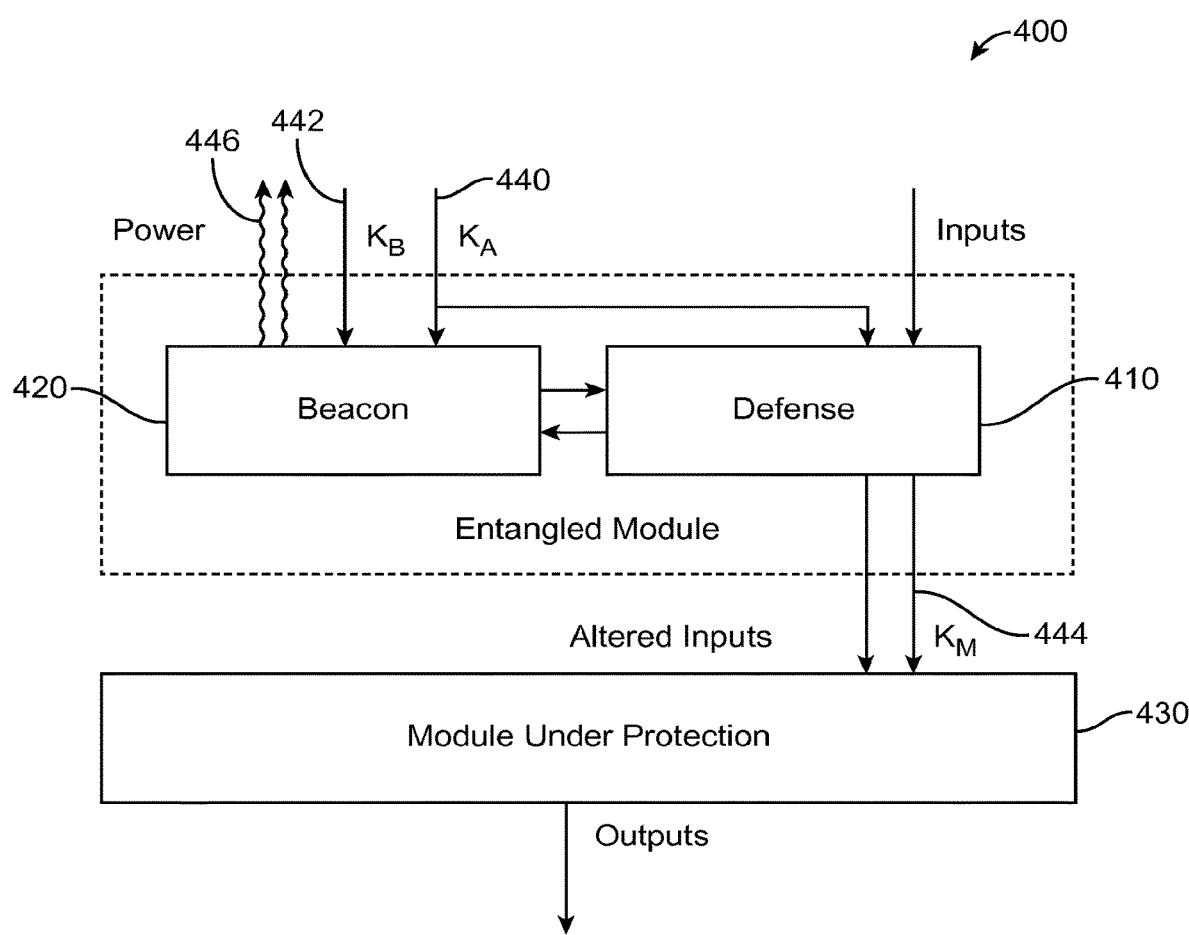
FIG. 4 is a schematic diagram of a system with a protection module and a side-channel beacon circuit incorporated into a device that includes an untrusted module that is to be protected.

Instead of trying to match the activity factors or trying to make them look similar, another solution that may be implemented is to take away the attacker's ability to turn on the circuits before fabrication. Thus, in some embodiments, the circuits may be prepared so that they can be turned on only when another special key, for example, the activation key $K_A$, is supplied to the beacon circuit(s) and the protection module(s). As noted, this key is kept secret from the foundry during manufacturing and can be provided through a single interface by using the same interface for the entangled beacon and protections. This is important because it means an attacker cannot simply trace the input pins to learn about the design protections and how they are entangled with the beacons. This technique for turning on circuits is known as key-based activation, and can be illustrated by the following example. Consider a situation where every intermediate wire in a design is XOR'd with a special input bit. If that input bit is a zero ('0'), the design works. If that bit is a one ('1'), the design essentially produces random noise. In this example, only by supplying all zeros can the design be made to function correctly. By introducing XOR and XNOR gates (or arbitrary functional equivalents) into designs, any design can be converted to a design that works only when some special inputs (an activation key) are supplied. As illustrated in FIG. 4, depicting a schematic diagram of a system 400 with a protection module 410 and a side-channel beacon circuit 420 incorporated into a device that includes a module 430 to be protected, a secret activation key 440 ($K_A$) is used for activating the beacon circuit 420 and the protection (defense) module 410, generally after the manufacturing of the system (e.g., the chip). Once activated, the beacon circuit will produce a pre-determined beacon output (e.g., such as a power signature 446) when provided with another, different, pre-determined key $K_B$ 442 (usually available only to an auditor that is to test to the trustworthiness or integrity of a manufactured implementation).

As provided in the pseudo-code for the Process 1, to combine the beacon with the protection and target modules, the beacon module (module B in the pseudo code example, and the beacon circuit 420 in the example schematic diagram of FIG. 4) is synthesized so that it is configured to be activated only after the key $K_A$ is provided to the manufactured module B (e.g., it can be activated in response to a comparison result confirming that the activation key provided matches the key for which the beacon circuit was configured to respond), and once the beacon key $K_B$ has been provided. In other words, to be activated both $K_A$ and $K_B$ are required. Process 2, provided below as pseudo code, is an example process to construct a beacon circuit using an activation key $K_A$ and a beacon key $K_B$ to light up (power up) the beacon circuit post circuit activation.

---
Process 2: Entangling a Beacon
---
1:   $K_A$ ← Activation Key (public after fabrication)
2:   $K_B$ ← Beacon Key (private)
3:   B ← state machine to recognize $K_B$
4:   for all bit w in $K_A$ do
5:       r ← random internal wire in B
6:       Insert XOR/XNOR equivalent to recognize value(w) at r
7:   end for
8:   Re-synthesize B with NAND logic

---

The above example process may be used to address the concern that an intelligent attacker could deduce (or guess) the value of an input bit (e.g., part of $K_A$) based on the logic the input bit feeds into. For example, in the toy case example, XORs could represent 0-bits and XNORs could represent 1-bits, making the attacker's job far too easy if the attacker can identify the gate types by examining the netlist. Semantically, a 0-bit should feed into an XOR followed by some arbitrary logic, while a 1-bit should feed into an XNOR followed by some arbitrary logic. Thus, to counter any such attempt by an attacker, at least one negating gate (e.g., NOT, NOR, NAND, etc.) may be inserted after each XOR so that every entry point is capable of processing either a 0 or 1 bit (see line 6 in the above pseudo code example of Process 2). Additionally, the whole beacon and protection implementation may be resynthesized using one type of gate (e.g., NAND gate) to enhance uniformity and prevent/inhibit these gate-identification attacks.

As noted, the beacon circuit implementation is synthesized with the protection module (e.g., the modules 220 or 410 of FIGS. 2 and 4, respectively). Both the beacon circuit and the protection module are configured to be activated with same activation key $K_A$. To ensure that an adversary does not leave the protection circuit and beacon intact while somehow replacing the untrusted module with another module that defeats the protection module, one solution that may be used is to derive an activation key for the target module, namely, the key $K_M$ (shown as key 444 in FIG. 4), from the circuits in the protection and beacon circuits/modules. This derivation ensures that the untrusted module will not work with a compromised protection or beacon module. The key derivation procedure may include, in some embodiments, using intermediate wires from the beacon and protection circuits to pull out the bits needed to produce the new derived key $K_M$. The wires are chosen such that when $K_A$ is supplied, $K_M$ is deterministically produced, while in all other cases the outputs are "don't-care bits" (values not equal to $K_M$).

From the perspective of an attacker, reverse engineering a beacon is equivalent to uncovering both $K_A$ and $K_B$, which is equivalent to guessing, for example, a 128-bit key. In some of the implementations described herein, neither key exists physically in memory on the chip. Rather, the keys are implicitly coded in the circuits. The key $K_M$ used for the module under protection (i.e., the target module, such as the modules 210 or 430 of FIGS. 2 and 4, respectively) is equivalent to a standard obfuscation key. Under the same principles that protect $K_A$ and $K_B$, $K_M$ cannot be easily guessed. $K_M$ can also be made larger (e.g., more bits) than $K_A$, if desirable, as the mapping from $K_A$ to $K_M$ does not need to be surjective. This means that a foundry generally cannot easily apply parametric backdoors or other foundry-specific attacks to the module under protection.

Once fabrication and auditing are finished, the secret keys can be released so that consumers can use them (likely via firmware). At that point, the keys should be considered to have been exposed. Thus, if subsequently a second fabrication run is needed, new keys should be chosen. If this creates a financial concern, one possible approach to avoid re-synthesis is to compare the production from the second run (using the same mask and not changing keys) to the devices produced in the first run. As another possibility, in some embodiments, the implementations may include inspection resistant memory.

Figure 5:
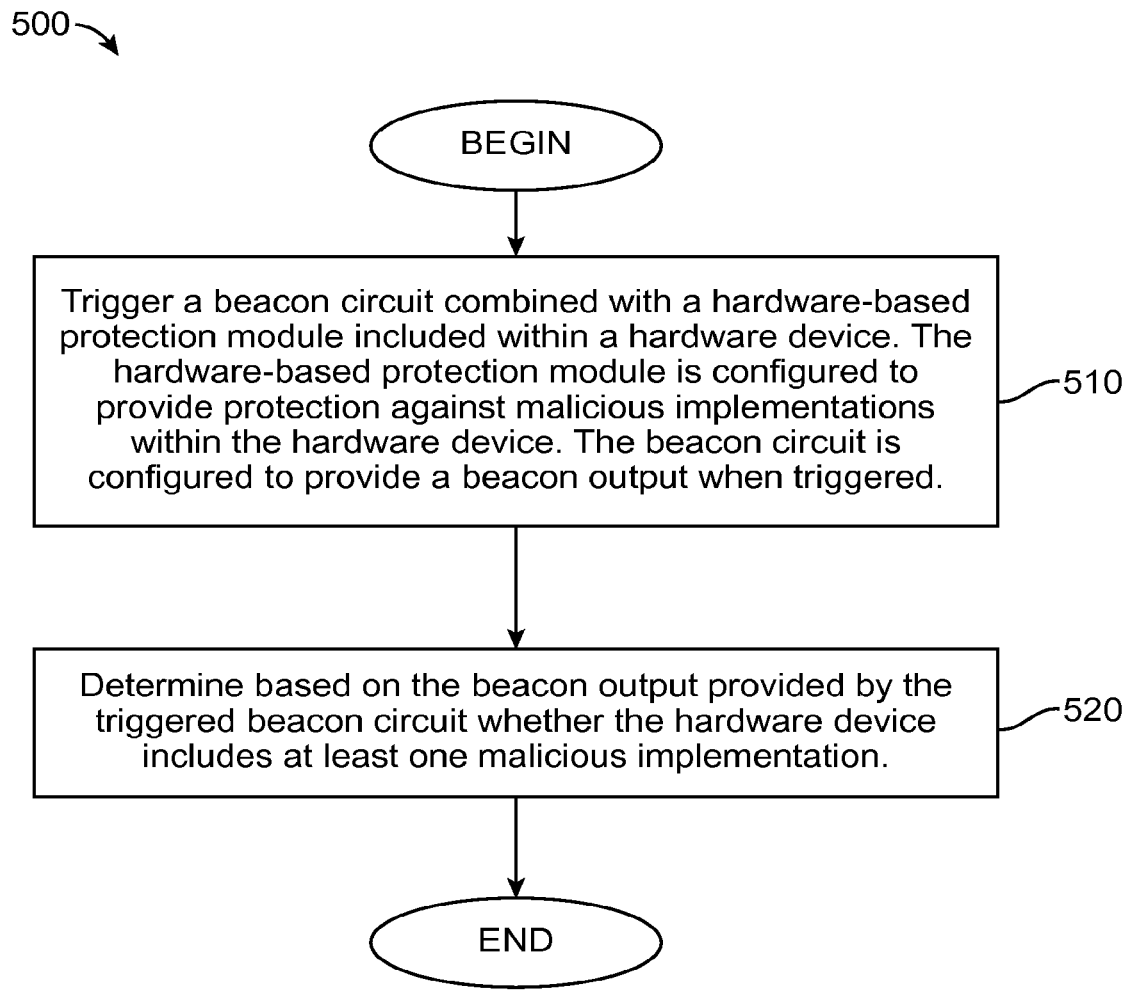
FIG. 5 is a flowchart of an example procedure to protect hardware-based devices from attacks.

With reference now to FIG. 5, a flowchart of an example procedure 500 to protect hardware-based devices from malicious attacks (e.g., backdoor attacks) is shown. In some embodiments, the procedure 500 may be performed using an apparatus that includes an interface to provide input to the hardware-based device, and measuring/recording equipment to obtain, measure, and/or analyze output produced by the hardware-based device (e.g., the apparatus may include current and/or voltage meters, infrared sensors to measure levels of heat produced, etc.) The procedure 500 includes triggering 510 a beacon circuit (such as the beacon circuits 230, 300, or 420 depicted in FIGS. 2, 3, and 4, respectively) combined (entangled) with a hardware-based protection module (e.g., the protection modules 220 or 410 shown in FIGS. 2 and 4, respectively), included within a hardware device. The hardware-based protection module is configured to provide protection against malicious implementations within the hardware device, and the beacon circuit is configured to provide a beacon output (e.g., a power signature, a digital output, etc.) when triggered.

In some embodiments, the beacon circuit is triggered upon being provided with input (e.g., a digital input) corresponding to a secret trigger or beacon key, $K_B$, that the beacon circuit is configured to recognize (e.g., using a controller implementation, such as a comparator-based controller implementation). As noted, in some embodiments, to inhibit an attacker's ability to circumvent the beacon circuit and/or the protection module mechanisms and implementations described herein (e.g., by studying the behavior of the protection module(s) and the beacon circuit(s) prior to manufacturing of the hardware device), the beacon circuit and protection module may be configured so that they would have to first activated, e.g., by an activation key $K_A$ that is kept secret until after the hardware implementation of the device has been manufactured. In some embodiments, the actual device (or certain modules thereof) that is to be implemented (and protected via protection modules and/or beacon circuits) may be configured so that it would first need to be activated using a module key, $K_M$, that is derived based on the secret key $K_A$. Thus, without knowing the secret key $K_A$, it would be very challenging for an attacker to introduce a malicious implementation into the hardware implementation of an intended circuit.

With continued reference to FIG. 5, based on the beacon output provided by the triggered beacon circuit, a determination is made 520 whether the hardware device includes at least one malicious implementation. For example, during auditing, the secret key $K_B$ (which is known to the auditor) is provided to the hardware implementation of the device that was manufactured, and the output of the beacon circuit is obtained (be it a power signature output, or digital output). A determination that the measured output matches the expected output indicates that there was likely no tampering of the protection circuits and/or the beacon circuits. A determination of a mismatch between the expected output and the actual, measured, output may indicate that the protection modules and/or the beacon circuits may have been compromised, and that, therefore, the device being tested may have a malicious implementation in it (e.g., a backdoor). As noted, in some embodiments, the output produced by the beacon circuit (when it is determined that the triggering input provided to the beacon circuit matches the beacon key associated with the beacon circuit) may be a power signature produced by pseudo-random logic block that emit power at some pre-determined level.

Figure 6:
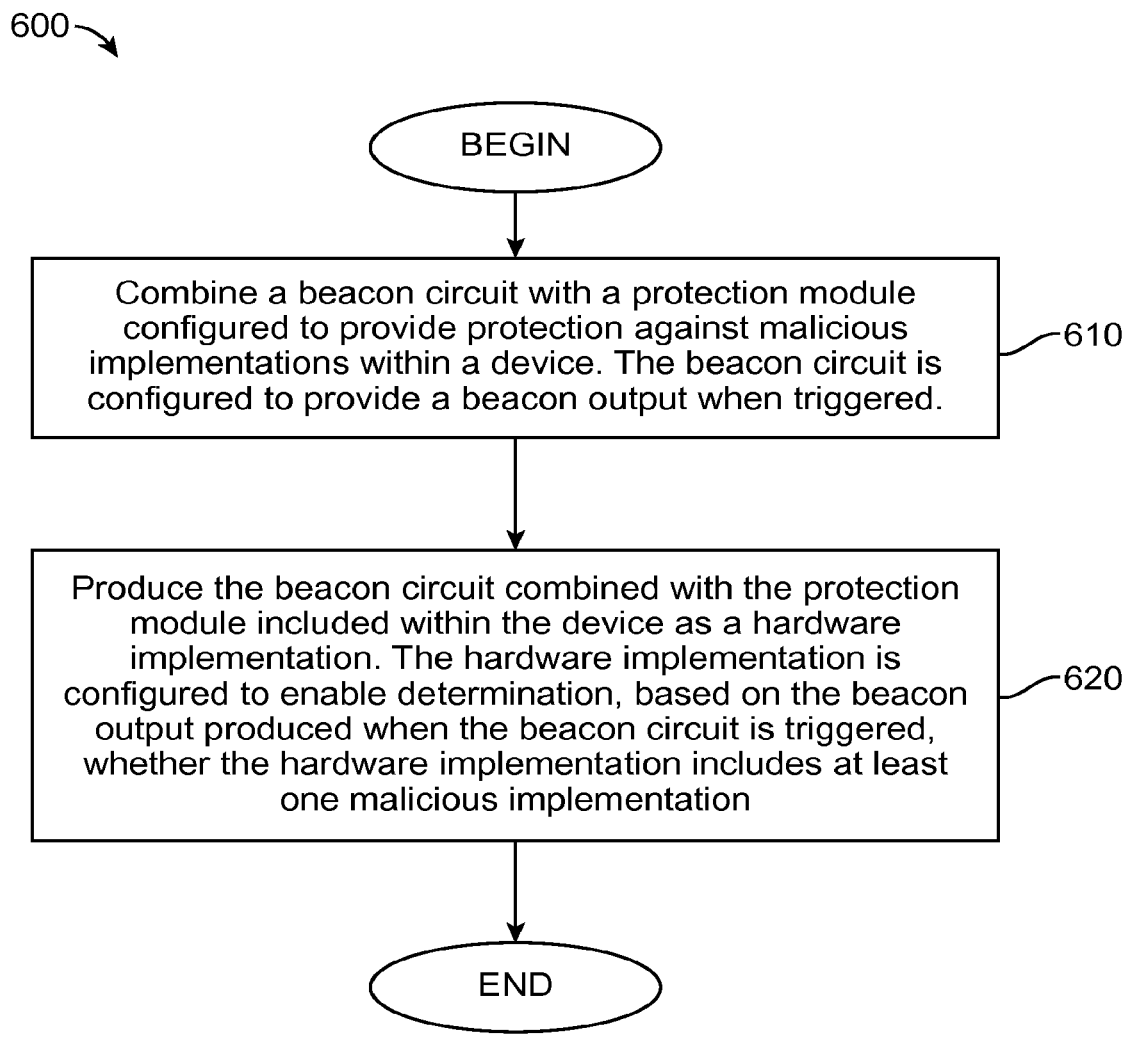
FIG. 6 is a flowchart of an example procedure to inhibit introduction of malicious implementations in fabricated devices.

With reference now to FIG. 6, a flowchart of an example procedure 600 to inhibit introduction of malicious implementations in fabricated devices is shown. The procedure 600 includes combining 610 a beacon circuit with a protection module configured to provide protection against malicious implementations within a device. The beacon circuit is configured to provide a beacon output (e.g., analog output, such a power signature, or digital output) when triggered (e.g., upon providing input matching a secret beacon key $K_B$ that the beacon circuit is configured to recognize).

The procedure 600 further includes producing 620 the beacon circuit combined with the protection module included within the device as a hardware implementation. The hardware implementation is configured to enable determination, based on the beacon output produced when the beacon circuit is triggered, whether the hardware implementation includes at least one malicious implementation.

Performing the various operations described herein may be facilitated by a computing or controller system. Such a system may be configured to cause operations that include triggering a beacon circuit and determining whether the produced output matches expected output. A controller system may also be incorporated, at least in part, into a hardware implementation comprising a beacon circuit, protection module(s) and/or functional modules of an intended device implementation, and/or may be used to perform operations to facilitate manufacturing of devices (e.g., integrated circuits) that include beacon circuit(s) combined with protection module(s).

Figure 7:
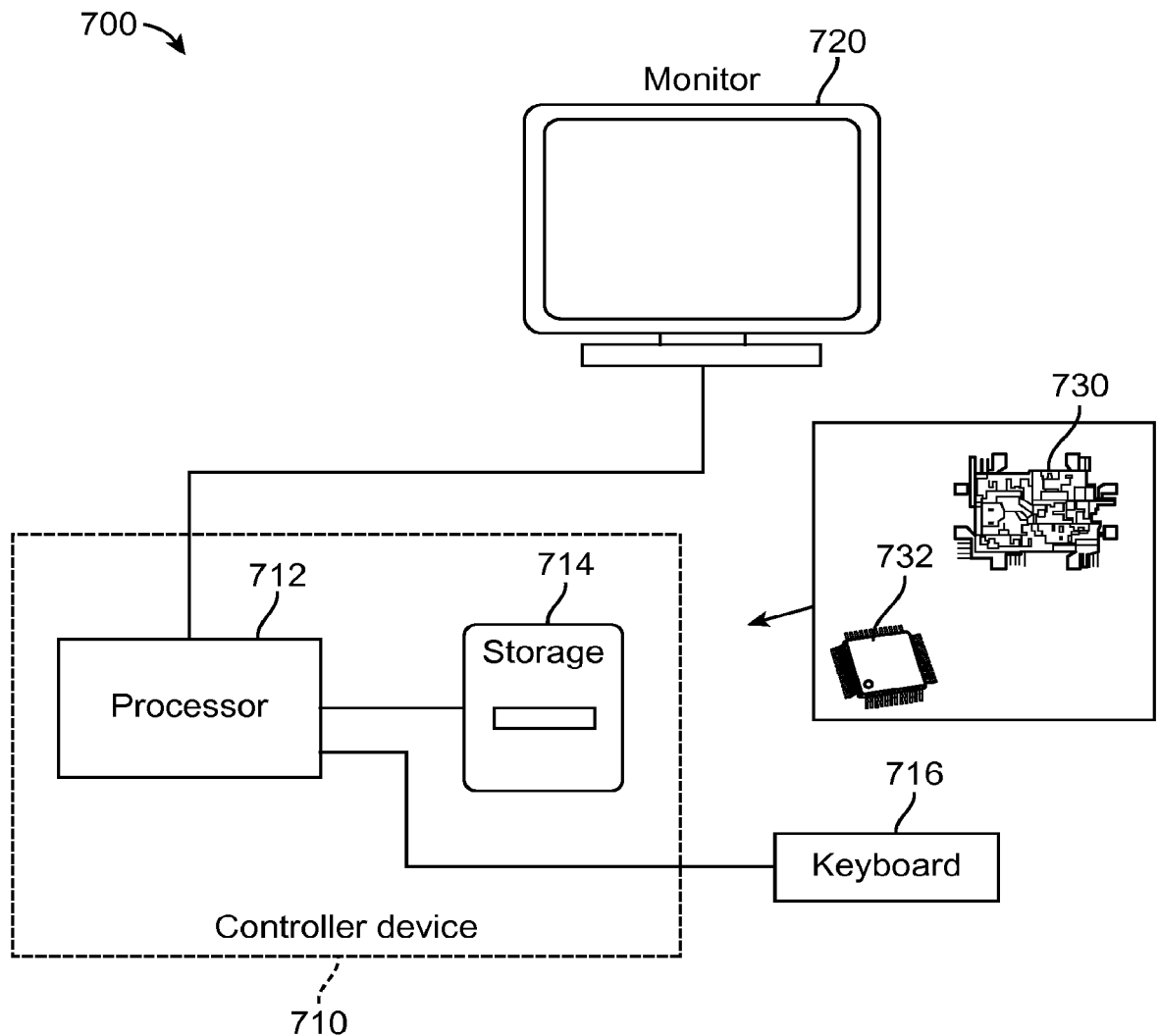
FIG. 7 is a diagram of an example controller system.

Particularly, with reference to FIG. 7, a diagram of an example controller system 700 is shown. The system 700 includes a controller device 710, such as a processor-based personal computer, a specialized computing device, and so forth, that includes, in some implementations, a processor-based unit such as central processor unit (CPU) 712. In some embodiments, the controller device 710 may be realized, at least in part, using modules such as an FPGA (field programmable gate array), an ASIC (application-specific integrated circuit), a DSP processor, etc. In addition to the CPU 712, the system includes main memory, cache memory and bus interface circuits (not shown in FIG. 7). The controller device 710 may include a mass storage element 714, such as a hard drive or flash drive associated with the system. The computing system 700 may further include a keyboard 716, or keypad, or some other user input interface, and a monitor 720, e.g., a CRT (cathode ray tube), LCD (liquid crystal display) monitor, etc., that may be placed where a user can access them.

The controller device 710 is configured to facilitate, for example, the procedures, techniques, and operations described herein. The storage device 714 may include a computer program product that when executed on, for example, a processor-based implementation of the controller device 710 causes the device to perform operations to facilitate the implementation of the procedures, techniques, and operations described herein. Such operations include triggering a beacon circuit in a hardware device (such as devices 730 and 732), and obtaining and evaluating the output of the beacon circuit. In some embodiments, the system 700 may be equipped with probes and sensors (e.g., voltage and current meters, infrared sensors, etc.; not shown in FIG. 7) to obtain and evaluate the output from, for example, the devices 730 and/or 732.

The controller device 710 may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. As noted, alternatively and/or additionally, in some embodiments, special purpose logic circuitry, e.g., an FPGA (field programmable gate array), an ASIC (application-specific integrated circuit), a DSP processor, etc., may be used in the implementation of the system 700. Other modules that may be included with the controller device 710 are speakers, a sound card, a pointing device, e.g., a mouse or a trackball, by which the user can provide input to the system 700. The controller device 710 may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication, e.g., a communication network. Examples of communication networks include a local area network ("LAN"), a wide area network ("WAN"), and the Internet.

The computing/controller system may include clients and servers. A client and server are generally remote from each other and typically interact through a communication network. The relationship of client and server generally arises by virtue of computer programs running on the respective computers and having a client-server relationship to each other.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

As part of testing and evaluation performed, the implementations described herein were synthesized using a Synopsys tool chain and standard 90 nm ASIC libraries. The Synopsys power analysis tools is used to acquire power information, in addition to area and timing reports. The power magnitude is altered by adjusting the size of the beacon. The important parameter is the size of what is generally called a "beacon grid." This grid is the matrix formed by tiling the rows of PRLs in the beacon. A beacon made out of x rows of height y can be referred to as an "x-by-y" beacon. The leakage power drawn scales with both the two flip-flops and the logic in the beacon grid. Ignoring second-order effects, the leakage power is approximately:

$$2L_f + L_c + xyL_g$$

where $L_f$ is the power leaked by a flip-flop and $L_c$ is the power leaked by the comparator. $L_g$ is the power leaked by an average gate in the grid, and thus the power leaked in an x-by-y beacon is approximately $xyL_g$. These power costs are generally linear, and thus the additional dynamic power usage that can be achieved scales as approximately $\alpha L_c + \alpha xyL_g$, where $\alpha$ is the activity factor (which, as noted, is kept high in the implementations described herein) of the combinational logic. The activity factor for the logic governing the flip-flops is effectively zero.

Figure 8:
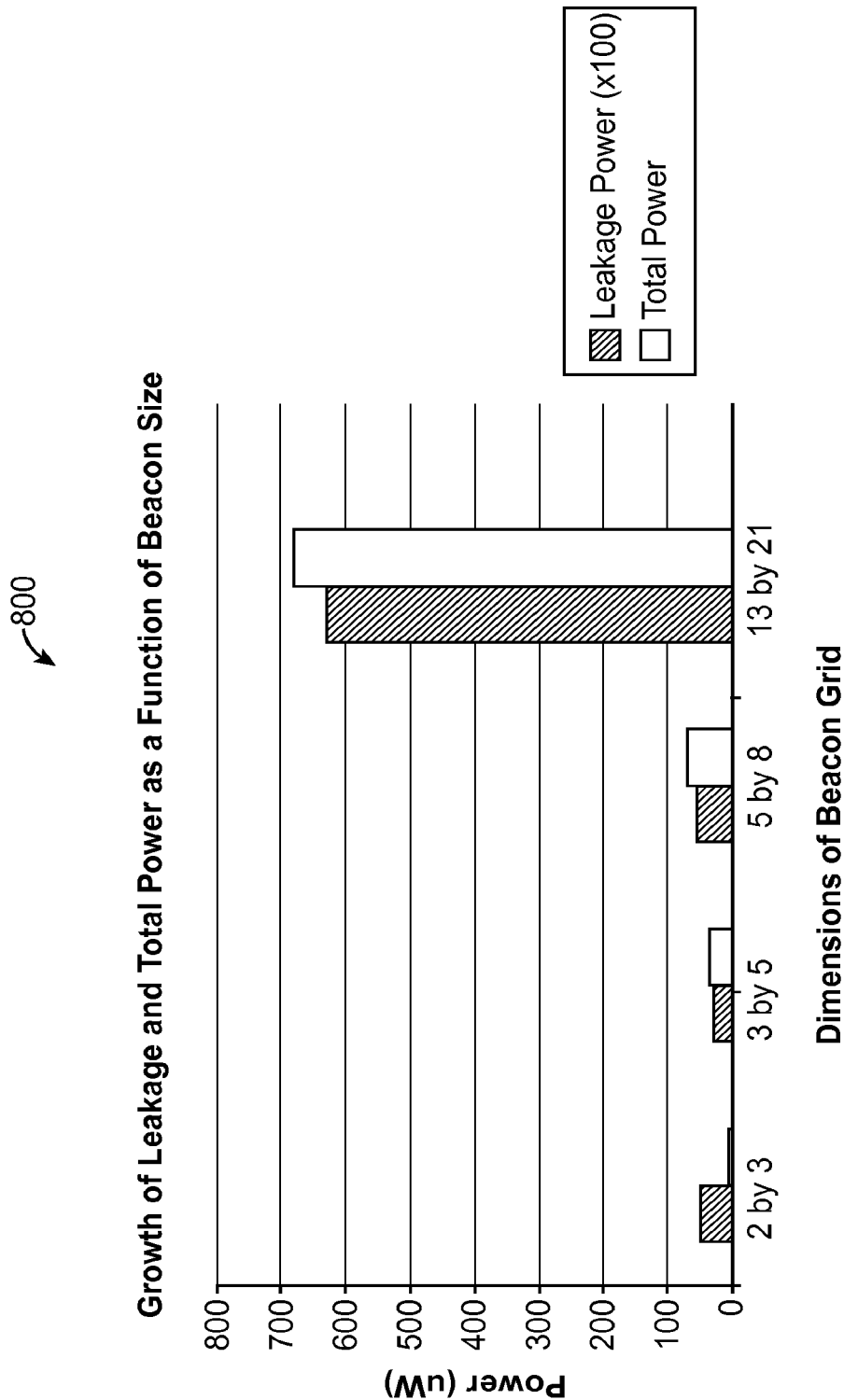
FIG. 8 is a graph of leakage and total power draws achieved by different sizes of beacon grids.
Figure 9:
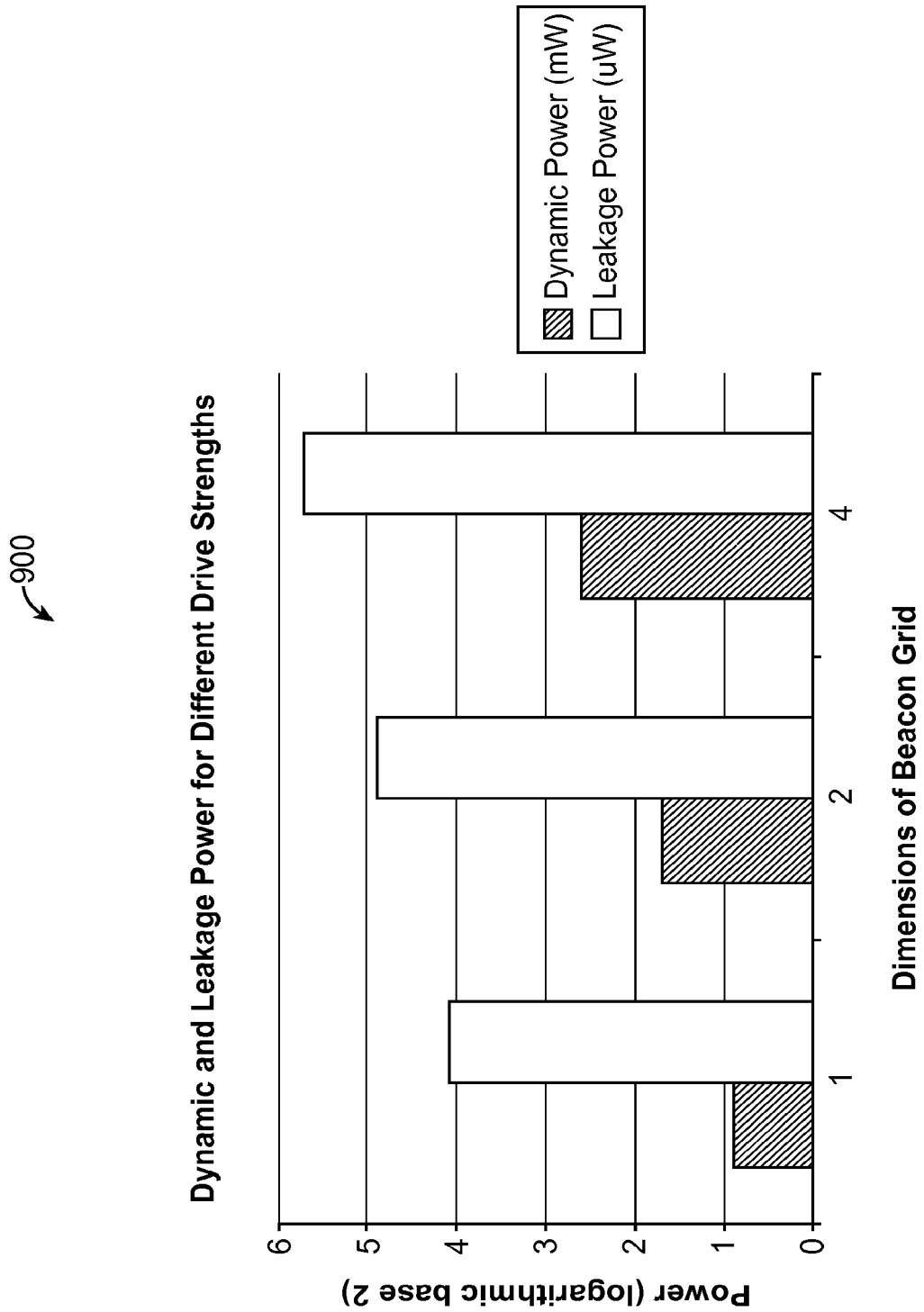
FIG. 9 is a graph of leakage and dynamic power draws achieved by different drive strengths for a beacon.

FIG. 8 includes a graph 800 of leakage and total power draws achieved by different sizes of beacon grids. The first dimension refers to the number of rows and the second dimension refers to the height of each row. As illustrated in FIG. 8, the constant leakage cost of the flip-flops matters only for extremely small beacons. By increasing the size of the beacon grid, the dynamic power draw can be brought up rapidly. Note that in FIG. 8 the bars representing for leakage power are multiplied by 100 in size to make them visible (the leakage power drawn is fairly negligible). FIG. 9 includes a graph 900 of leakage and dynamic power draws achieved by different drive strengths for a beacon. Higher drive strength can allow for more dynamic power from a fixed number of gates. It is to be noted that the leakage power is provided in FIG. 9 in microwatts, while the dynamic power is provided in milliwatts, thus illustrating that the leakage power is relatively small.

To test and evaluate the methods, systems, and other implementations described herein, several case studies were performed. In a first case study, a TrustNet defense system was implemented and studied. The TrustNet defense system is a design-level defense that allows for the continuous assertion of micro-architectural invariants. In this case study, beacons may be used to complement and harden TrustNet. Without a beacon, TrustNet by itself would be relatively easy to disable via a malicious foundry. Assuming the gates, which are defined a priori, could be located, disabling the defense system could be done by severing a single wire or causing a single stuck-at-one fault.

Figures 10, 11:
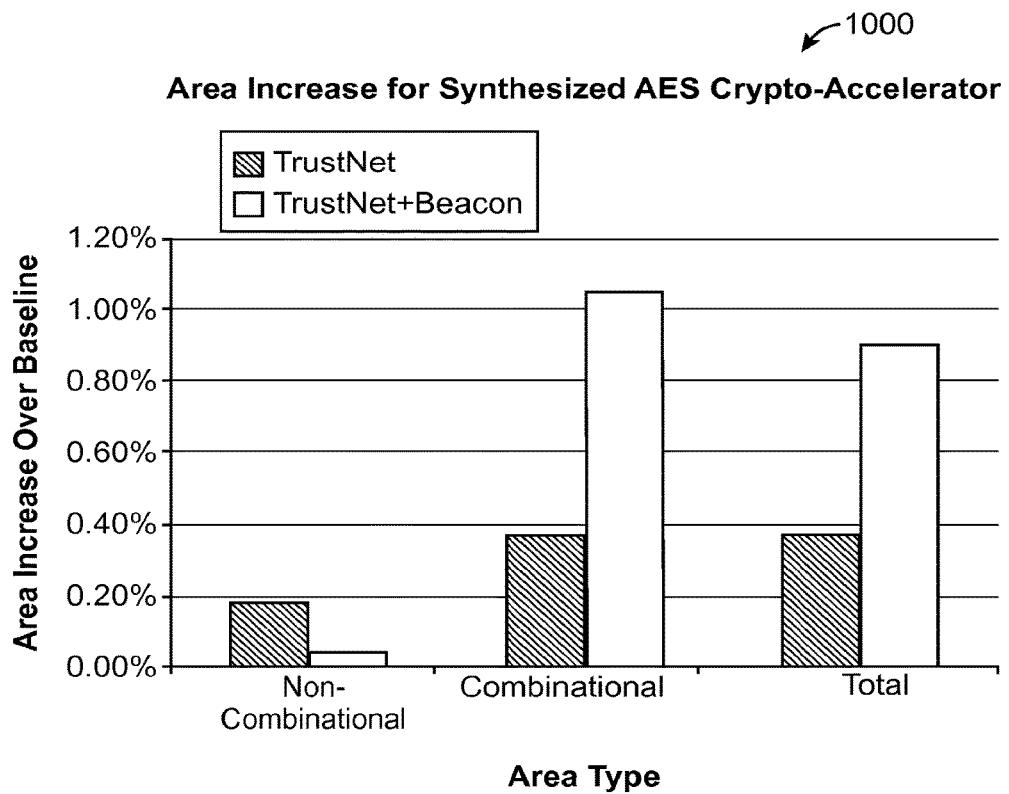
FIG. 10 is a graph showing the overheads associated with TrustNet and with a beacon added to TrustNet.
FIG. 11 is a table providing attributes and specifications for processor cores used in testing and evaluation of the implementation described herein.

As part of the testing and evaluation performed, three different applications of TrustNet were considered to study costs of different deployment conditions. Particularly, the three cores that were examined included a cryptographic accelerator, a small general purpose core and a larger general purpose core. An AES accelerator is an interesting case for the necessity of hardware security. By definition, such accelerators are given privileged access to secret data. This makes them prime targets for attack by malicious entities. For the case study conducted, an emitter backdoor was implemented into a custom AES accelerator design. An emitter backdoor is a backdoor that performs one or a few extra operations during idle cycles to achieve a malicious payload without interrupting the normal stream of transactions. Emitter backdoors are stealthy and effective because they do not alter the outputs of running programs in easily noticeable ways. In this case study, the four components built to demonstrate a TrustNet beacon included: 1) a custom AES accelerator, implemented in the Verilog HDL, 2) a hidden emitter backdoor in the AES, 3) a TrustNet module that disables emitter backdoors by checking that the in-packets match the out-packets cycle for cycle in the AES, and 4) an obfuscated beacon that attests to the presence of the TrustNet module. FIG. 10 includes a graph 1000 showing the overheads associated with TrustNet and with a beacon added to TrustNet (overheads are shown as a percentage of the baseline system). In order to implement TrustNet to meet the timing requirements of the custom AES unit, a small amount of pipelining had to be added to the original implementation of TrustNet. As expected, the non-combinational area overheads were determined to be nearly zero. The combinational area overhead of the beacon is comparable to that of TrustNet itself.

Figure 12:
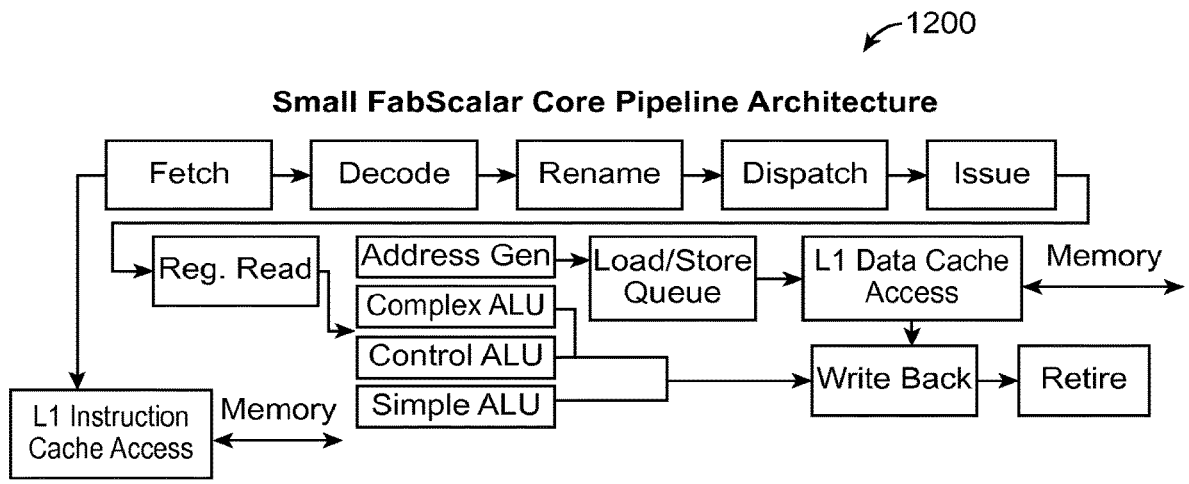
FIG. 12 is a schematic diagram of an architectural implementation of a Fab Scalar core.

For the second application tested for the TrustNet case study, an out-of-order general purpose core was studied. In this case, FabScalar, which is a framework for automatically generating implementations of microprocessors, was used. The Fabscalar framework is capable of generating cores with different sizes and features (such as different fetch widths, commit widths, number of execution units, issue policies etc.) The attributes and specifications for the small, out-of-order core (as well attributes of the large core used for the third application examined in the TrustNet case study) are provided in a table 1100 identified as (Table I) shown in FIG. 11. A schematic diagram of an architectural implementation 1200 of a FabScalar core is shown in FIG. 12 The security in TrustNet is based on finding invariants of hardware designs. Many invariants of FabScalar cores are true for all generated cores, regardless of the given parameters.

Figure 13:
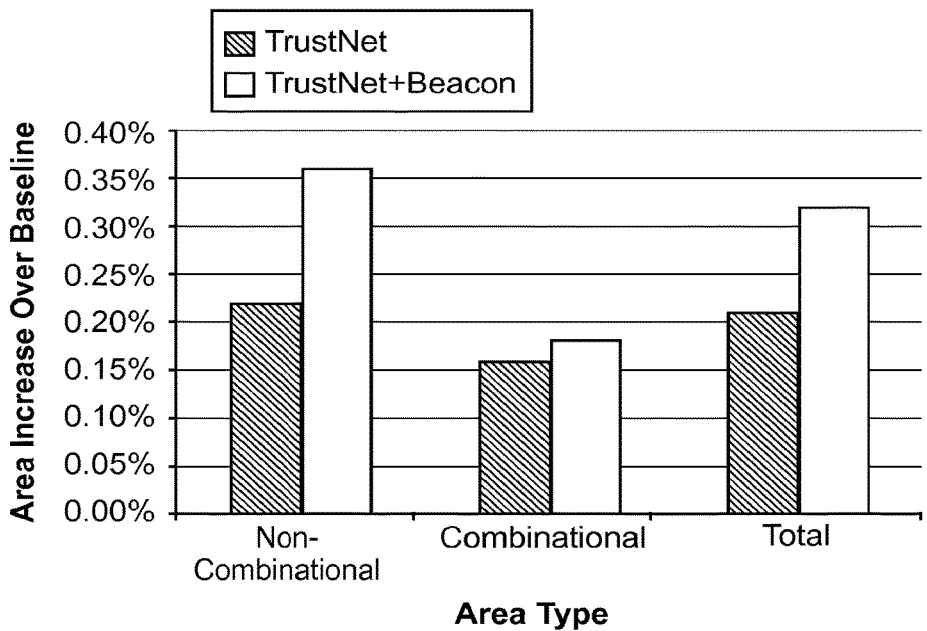
FIG. 13 is a graph showing area overheads associated with adding TrustNet defense modules and a beacon.

FIG. 13 includes a graph 1300 shows area overheads associated with adding TrustNet defense modules and also adding a beacon that attests to the presence of TrustNet. As shown, because the beacon overhead is smaller even than that of the backdoor defense, it amounts to only a small fraction of one percent. It is also to be noted that the overhead of a beacon is amplified by the choice of activation method. Applying key-based activation increases the total overhead in this case to 1.7%.

Figure 14:
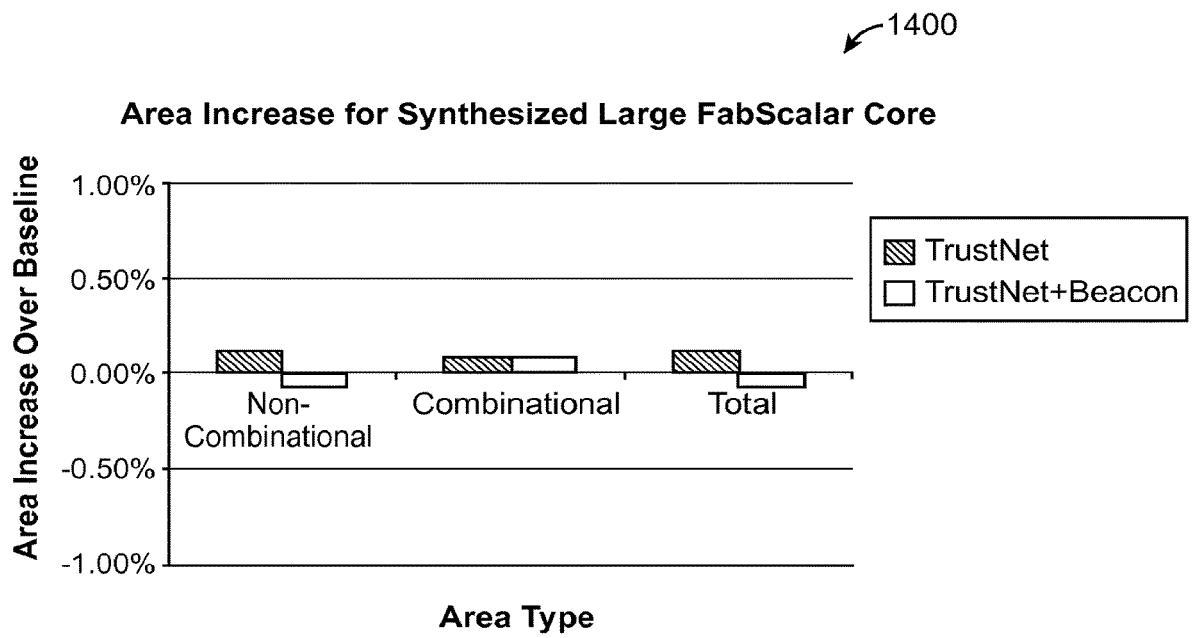
FIG. 14 is a graph showing area overheads results when a TrustNet defense system is included with a large Fab Scalar core.
Figure 15:
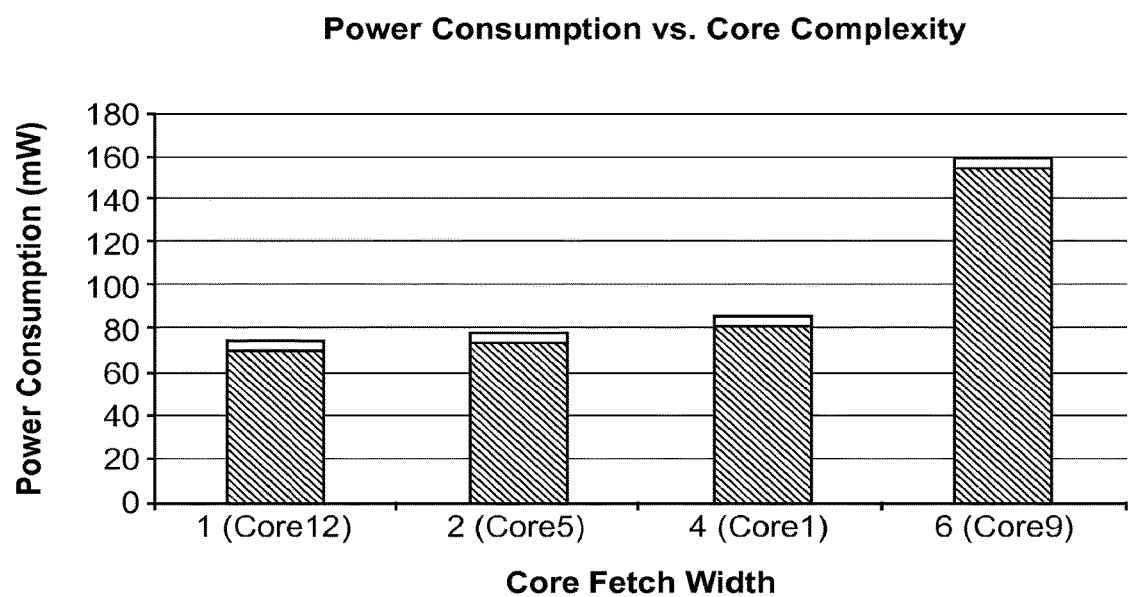
FIG. 15 is a graph showing power costs for combining a beacon circuit with a TrustNet defense system.

FIG. 14 includes a graph 1400 showing area overheads results when a TrustNet defense system (i.e., protection module) was included with a large FabScalar core. Because in this case a large core is used, the impact of combining a beacon circuit with the TrustNet defense system is much smaller as a percentage. With reference to FIG. 15, a graph 1500 providing data of the power costs of combining a beacon circuit with a defense system (specifically, the TrustNet system), is provided. In FIG. 15, the labels on the bars are the names these cores have within the FabScalar family. As shown, the power costs relatively diminish as chip implementation scales to larger size (if the beacon size is roughly constant, the overhead diminishes when compared against power consumed by larger and larger cores). Thus, the closer a design is to the power wall, the cheaper it is to use a beacon.

Figure 16:
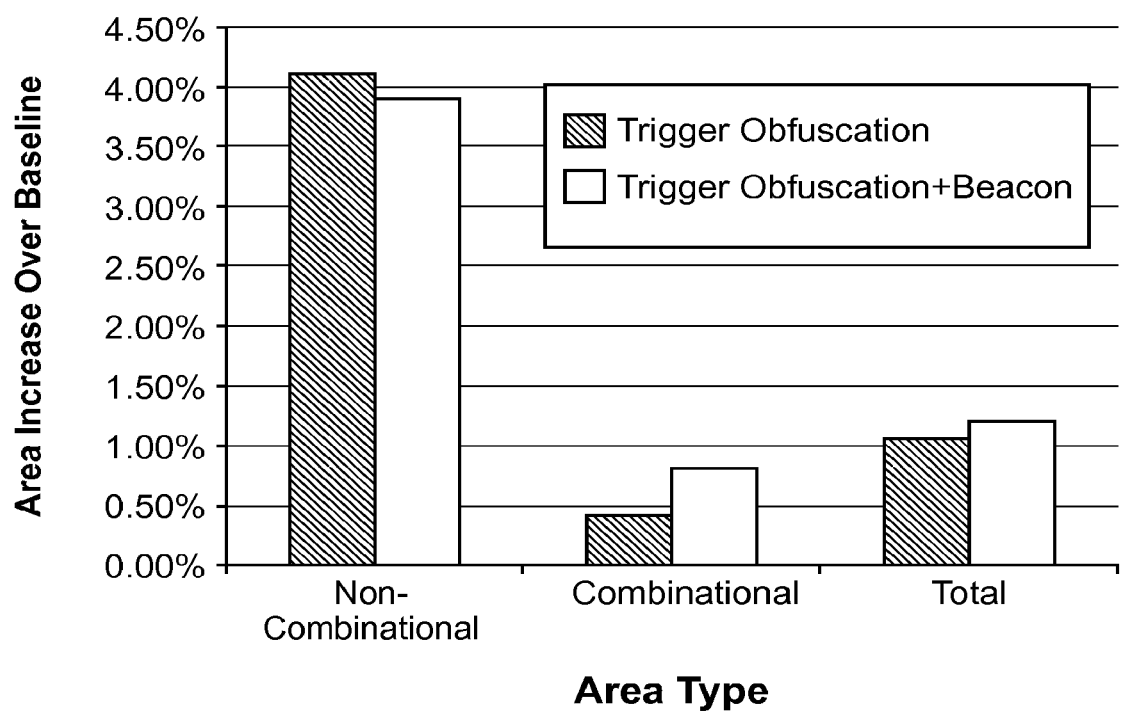
FIG. 16 is a graph showing area overhead costs for a trigger obfuscation defense mechanism and a beacon.

In a second case study conducted to test and evaluate the methods, systems, and other implementations described herein, a watermarking trigger obfuscation defense system (protection module) was used. The idea behind trigger obfuscation is to scramble the inputs coming into hardware modules dynamically and in benign ways so that malicious triggers are unlikely to reach their destinations. Trigger obfuscation is another example, like the TrustNet mechanism, of a defense mechanism that includes a relatively small piece of circuitry that could potentially be identified by a malicious foundry. The trigger obfuscation system is slightly more complex than TrustNet. However, re-routing a few key wires in the defense logic could disable the effects of the defensive system. Accordingly, the impact of beacon circuits as a complementary tool to trigger obfuscation was investigated, using a custom AES crypto-accelerator as the baseline design. FIG. 16 includes a graph 1600 showing the area overhead costs for a trigger obfuscation defense mechanism and a beacon, placed in a custom AES crypto-accelerator. As shown in FIG. 16, because trigger obfuscation is a more heavy-weight defensive mechanism, the area impact of including a beacon with the implementation is very small.

In the case studies, and all other testing and evaluations performed for the methods, systems, and other implementations described herein, various beacon implementations were described. These implementations could be applied to any standard ASIC hardware design and may be adapted to custom circuit designs as well. Beacon circuit implementations, as described herein, include characteristics and advantages that enable the beacon circuits to be used with various types of technologies, including:

Beacon circuitry can perform any common functionality, as long as it has a high activity factor. A beacon circuit, however, does not need to have an activity factor of exactly one (1). This could be useful if it is desirable to make the beacon circuit look like something specific, such as ALUs.

Low-level synthesis attributes are configurable. For example, if an entire design is done with low drive strength, the beacon can be configured to have the same low drive strength. Other physical attributes, such as frequency and voltage, can be similarly matched.

There are generally no restrictions on how intense or long-lasting a power side-channel beacon needs to be. Regardless of circumstantial details (such as the ability of security engineers to measure power emanations) beacons can be configured to match the needs of engineers.

The design restrictions on beacons impact the trade-offs between different approaches. For instance, in high-frequency designs, developers may want the beacon delay to be comparable with the length of the critical paths between latches. There are a few easy ways to solve this problem. One option is to use a clock period divider so that the beacon signal takes multiple clock cycles (in the primary clock domain) to propagate. As a proof of concept, a version of this was implemented without problems using standard ASIC tools. A second option is to use pipeline latches to make the beacon match the fastest clock domain. One downside is that latches take up area and suffer from leakage power dissipation. This does not detract from the effectiveness of the beacon, but it increases the overhead by the cost of the latches. Another option is to use unreliable latches for the beacon grid. This allows the beacon to meet various timing requirement. It is also a good place to use unreliable latches, because correctness does not matter. Whether or not this is a viable option may depend on the choice of foundry.

One additional point to note relates to the choice of the work that a beacon circuit does. If malicious foundries improve the state-of-the-art in the future, it might become possible to guess which gates are too quiet or are doing abnormal work. An optional trade-off then would be to perform work in beacon circuits that looks like real work. For example, a beacon circuit could perform a series of addition operations, the results of which could be thrown away.

Thus, as described herein, a unified approach to protect the hardware design and fabrication life cycle against tampering and backdoors is provided. The approach is based on use of a form of beacon protection and use of a form of entanglement to protect against foundry-level tampering and backdoor insertion, thus yielding a trustworthy product. In the implementations described herein, beacon circuits may be applied to any type of standard digital circuit. Additionally, obfuscation techniques (e.g., netlist obfuscation, and/or other types of obfuscation strategies) can be employed to prevent the counterfeiting of the beacon circuits. As noted, two case studies were performed in which two out-of-order computational cores, as well as a custom AES cryptographic core, were considered. Results of the case studies showed that the cost (e.g., in terms of added power consumption and/or increased chip size or area) is low, often even less than the costs of lightweight design-level solutions. Beacons are also flexible and can adapt to a wide array of implementation constraints.

Generally, as understanding of the constraints of a setting become more well understood, both an attacker (e.g., a rogue foundry, or some other third-part attacker) and the defender (the party seeking to implement its design) are able to raise their respective levels of effectiveness. For this reason, fixed defenses that cannot adapt rarely last long. As discussed herein, an important component of a defense strategy is the use of attestation. Given a process that places devices physically in the hands of malicious entities (as in the case of having an independent foundry perform the manufacturing/fabrication process), attestation techniques will likely become increasingly more important in order to provide some level of post-fabrication security guarantees.

The implementations described herein rely, in some situations, on the use of defense-in-depth approaches in which multiple layers of security are used to increase the likelihood that at least one layer of defense will foil an attack. A first layer of defense, in some embodiments, may include backdoor defense mechanisms, with the additional defense layers including use of beacon-based techniques and key-based activation. The inclusion of the multiple defense layers can thwart a multi-party conspiracy in which a rogue foundry tries to force a backdoor through. The attestation aspect of incorporated beacon circuits can alert of the existence of a backdoor in a compromised circuit if an attacker has managed to defeat the first layer(s) of defense.

One interesting benefit of the approaches discussed herein is that they provide resiliency against advanced reverse engineering techniques. It is assumed that the attacker can reverse engineer a netlist, and that once a fabrication run has been finished and has gone through attestation, all relevant keys are stolen or made public. Thus, the approaches described herein lower concern over physical attacks in which keys are extracted out of devices, because, in the present approaches, by the time the devices have been fabricated, the keys are no longer confidential anyway. With regards to flexibility, another advantage/benefit of the attestation-based approaches and implementations discussed herein is that these approaches and implementations adapt to new advances in physical inspection and to improved micro-level understanding of manufactured devices. As technology improves, both attackers and defenders will have enhanced capabilities to manipulate and observe fine details in chips, and as long as the defense continues to keep pace with the offense, attestation (by serving as the final action in what would otherwise be a fair game) will continue favoring the defending side. A positive result that comes out of a simple thought experiment is that in the absolute end game, the defenders get to win in this setting. Taking the long view, whenever the state-of-the-art reaches the point that reverse engineering of chips can be done perfectly, attestation can also be done in a precise way. Fabricated chips can be checked to ensure that they are identical to designs. In that setting, where there are no technological limitations, the defense wins due to attestation providing the last action.

Although particular embodiments have been disclosed herein in detail, this has been done by way of example for purposes of illustration only, and is not intended to be limiting with respect to the scope of the appended claims, which follow. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
   triggering a beacon circuit combined with a hardware-based protection module, included within a hardware device, the hardware-based protection module configured to provide protection against malicious implementations within the hardware device, wherein the beacon circuit is configured, upon activation of the beacon circuit with activation input, to provide a beacon output when triggered with triggering input different from the activation input, wherein the beacon output comprises one or more of: an output power profile produced by the beacon circuit, or a digital output; and
   determining based on the beacon output provided by the triggered beacon circuit whether the hardware device includes at least one malicious implementation;
   wherein the output power profile is produced by a plurality of power producing circuits, each of the plurality of power producing circuits comprising one or more logic gates, wherein the plurality of power producing circuits comprises a plurality of pseudo-random logic blocks, each of depth one, and wherein each of the plurality of pseudo-random logic blocks is tiled next to another of the plurality of pseudo-random logic blocks to form a grid of logic blocks.

2. The method of claim 1, wherein determining whether the hardware device includes the at least one malicious implementation comprises:
   determining if the beacon output provided by the triggered beacon circuit matches a pre-determined beacon output.

3. The method of claim 1, wherein triggering the beacon circuit comprises:
receiving an input trigger key; and
triggering the beacon circuit in response to a determination that the received input trigger key matches a pre-determined beacon key, $K_B$, associated with the beacon circuit.

4. The method of claim 1, further comprising:
activating the beacon circuit and the protection module in response to receiving, at the hardware device, a pre-determined activation key $K_A$, the beacon circuit and the hardware-based protection module of the hardware device configured to recognize the pre-determined activation key $K_A$.

5. The method of claim 4, further comprising:
activating one or more modules of the hardware device in response to receiving, at the hardware device, a pre-determined module activation key $K_M$ derived based on the pre-determined activation key $K_A$, wherein the one or more modules of the hardware device are configured to recognize the pre-determined module activation key $K_M$.

6. A system comprising:
a hardware device including a hardware-based protection module, configured to provide protection against malicious implementations within the hardware device, the hardware-based protection module combined with a beacon circuit configured, upon activation of the beacon circuit with activation input, to provide a beacon output when triggered with triggering input different from the activation input, wherein the beacon output comprises one or more of: an output power profile produced by the beacon circuit, or a digital output; and
a controller configured to, when operating, cause operations comprising:
triggering the beacon circuit combined with the hardware-based protection module included within the hardware device; and
determining based on the beacon output provided by the triggered beacon circuit whether the hardware device includes at least one malicious implementation;
wherein the output power profile is produced by a plurality of power producing circuits, each of the plurality of power producing circuits comprising one or more logic gates, wherein the plurality of power producing circuits comprises a plurality of pseudo-random logic blocks, each of depth one, and wherein each of the plurality of pseudo-random logic blocks is tiled next to another of the plurality of pseudo-random logic blocks to form a grid of logic blocks.

7. The system of claim 6, wherein determining whether the hardware device includes the at least one malicious implementation comprises:
determining if the beacon output provided by the triggered beacon circuit matches a pre-determined beacon output.

8. The system of claim 6, wherein the controller is further configured, when operating, to cause further operations comprising:
transmitting a pre-determined activation key $K_A$;
the beacon circuit and the protection module are configured to be activated in response to receiving and recognizing, at the hardware device, the pre-determined activation key $K_A$.

9. The system of claim 8, wherein the one or more modules of the hardware device are configured to be activated in response to receiving and recognizing, at the hardware device, a pre-determined module activation key $K_M$ derived based on the pre-determined activation key $K_A$.

10. The system of claim 6, further comprising:
measurement apparatus to measure the beacon output provided by the triggered beacon circuit, the measurement apparatus comprising one or more of: a current sensor, a voltage sensor, an infrared sensor, or a probe to detect the digital output.

11. The method comprising:
combining a beacon circuit with a protection module configured to provide protection against malicious implementations within a device, wherein the beacon circuit is configured, upon activation of the beacon circuit with activation input, to provide a beacon output when triggered with triggering input different from the activation input, wherein the beacon output comprises one or more of: an output power profile produced by the beacon circuit, or a digital output; and
producing the beacon circuit combined with the protection module included within the device as a hardware implementation, the hardware implementation configured to enable determination, based on the beacon output produced when the beacon circuit is triggered, whether the hardware implementation includes at least one malicious implementation;
wherein the output power profile is produced by a plurality of power producing circuits, each of the plurality of power producing circuits comprising one or more logic gates, wherein the plurality of power producing circuits comprises a plurality of pseudo-random logic blocks, each of depth one, and wherein each of the plurality of pseudo-random logic blocks is tiled next to another of the plurality of pseudo-random logic blocks to form a grid of logic blocks.

12. The method of claim 11, wherein producing the beacon circuit combined with the protection module included within the device as the hardware implementation comprises:
producing the hardware implementation such that the protection module and the beacon circuit combined with the protection module are activated when a pre-determined activation key, $K_A$, is provided to the hardware implementation.

13. A hardware device comprising:
one or more modules to perform pre-specified operations;
one or more protection modules configured to provide protection against potential malicious implementations within the hardware device; and
one or more beacon circuits combined with the one or more protection modules, each of the one or more beacon circuits configured, upon activation of the one or more beacon circuits with at least one activation input, to provide respective one or more beacon outputs when triggered with at least one triggering input different from the at least one activation input, to facilitate determination of whether the hardware device includes at least one malicious implementation, wherein each of the respective one or more beacon outputs comprises one or more of: an output power profile produced by the beacon circuit, or a digital output, wherein the output power profile is produced by a plurality of power producing circuits, each of the plurality of power producing circuits comprising one or more logic gates, wherein the plurality of power producing circuits comprises a plurality of pseudo-random logic blocks, each of depth one, and wherein each of the plurality of pseudo-random logic blocks is tiled next to another of the plurality of pseudo-random logic blocks to form a grid of logic blocks.

14. The hardware device of claim 13, wherein the one or more beacon circuits and the one or more protection modules are configured to be activated in response to receiving, at the hardware device, at least one pre-determined activation key $K_A$, associated with the hardware device.

15. The hardware device of claim 14, wherein the each of the one or more beacon circuits is configured to be triggered subsequent to activation of the each of the one or more beacon circuits and the one or more hardware-based protection modules with the at least one pre-determined activation key $K_A$.

16. The hardware device system of claim 14, wherein the one or more modules of the hardware device is configured to be activated in response to receiving, at the hardware device, at least one pre-determined module activation key $K_M$ derived based on the at least one pre-determined activation key $K_A$.

* * * * *